Figure 1F:
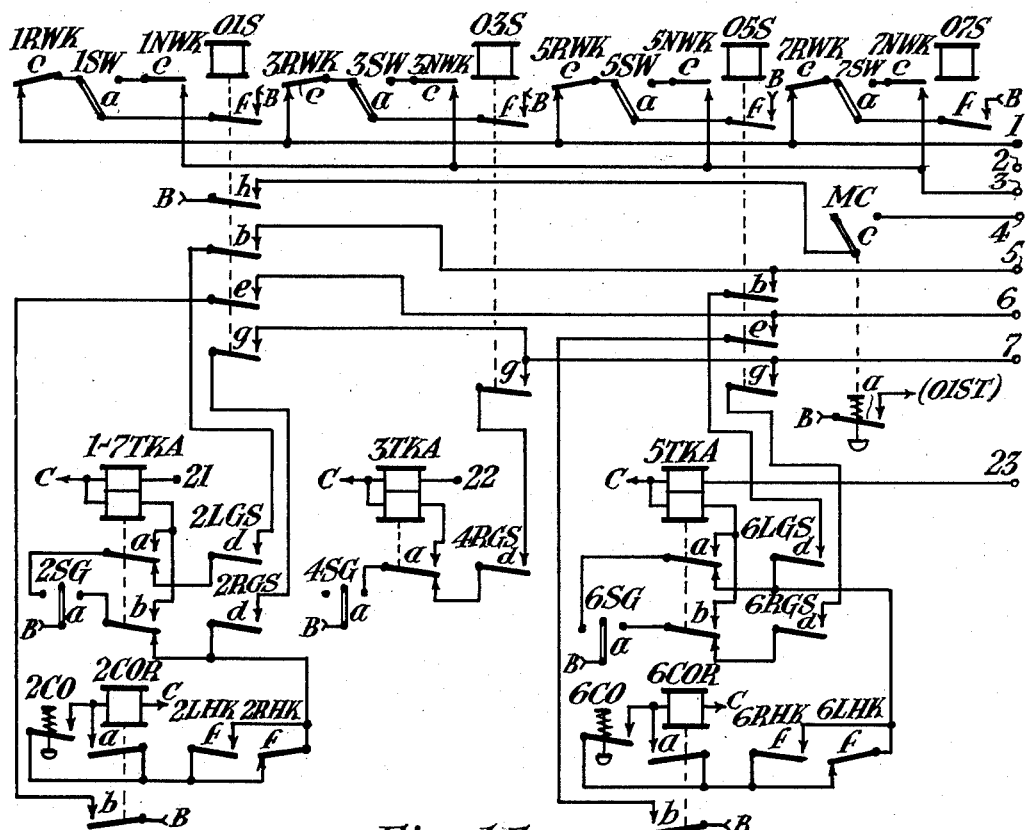

April 15, 1952 — A. L. JEROME ET AL — 2,592,704
CENTRALIZED TRAFFIC CONTROL SYSTEM OF THE CODE
TYPE FOR THE CONTROL OF INTERLOCKED TRACK
SWITCHES AND RAILWAY SIGNALS
Filed Feb. 23, 1946 — 9 Sheets-Sheet 1
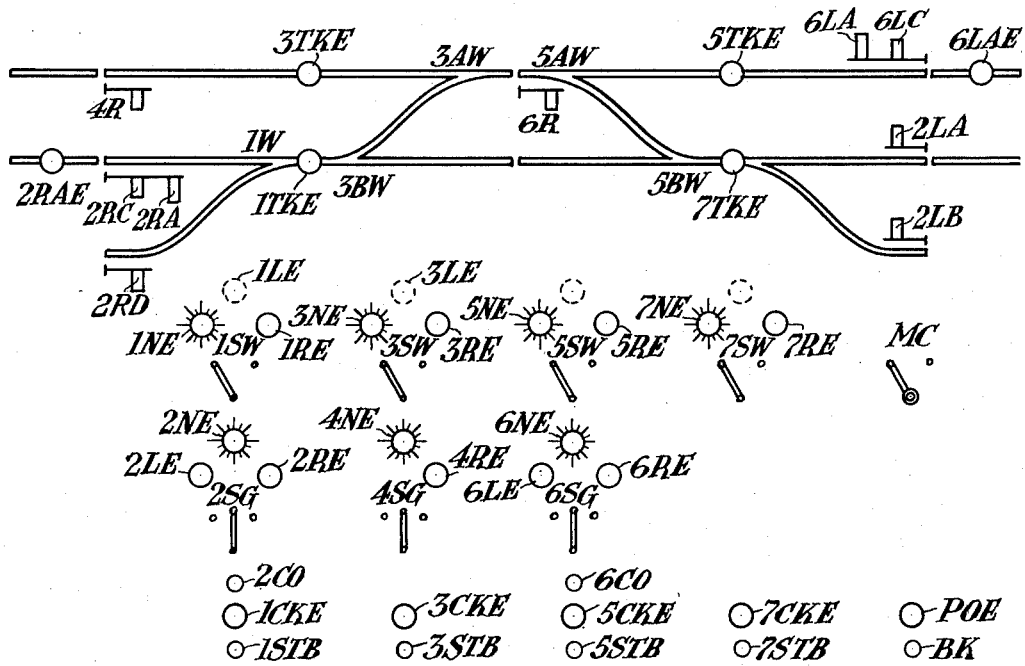
Fig.1A.
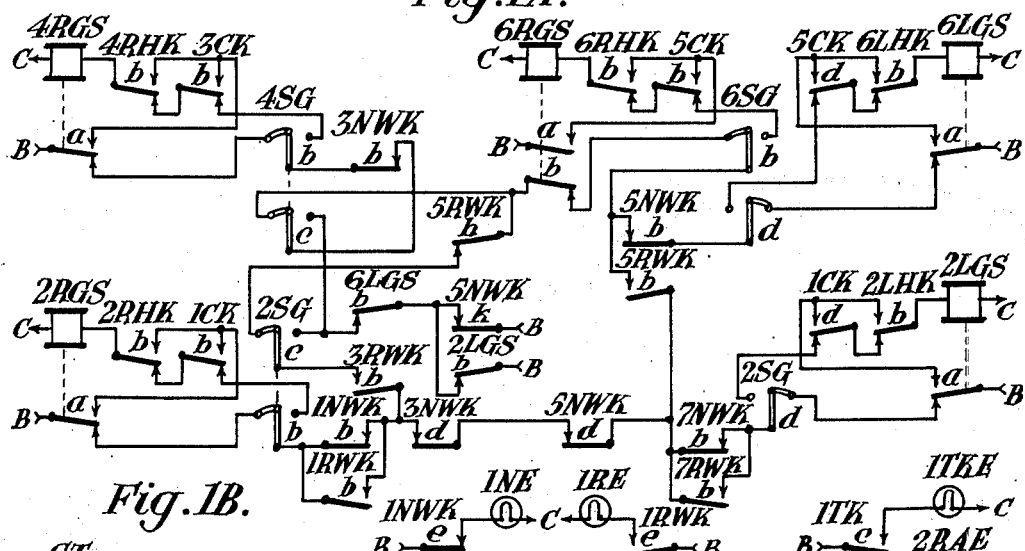
Fig.1B. Fig.1D. Fig.1E.
Fig.1C.
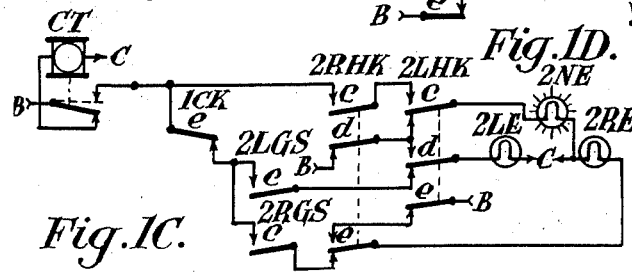
INVENTORS
Arthur L. Jerome, Lloyd V. Lewis
and Frank T. Pascoe.
BY
Their Attorney.

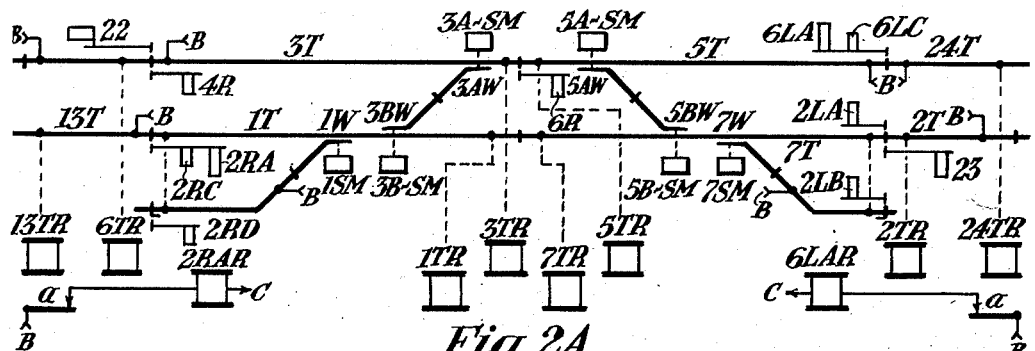
Fig. 2A.
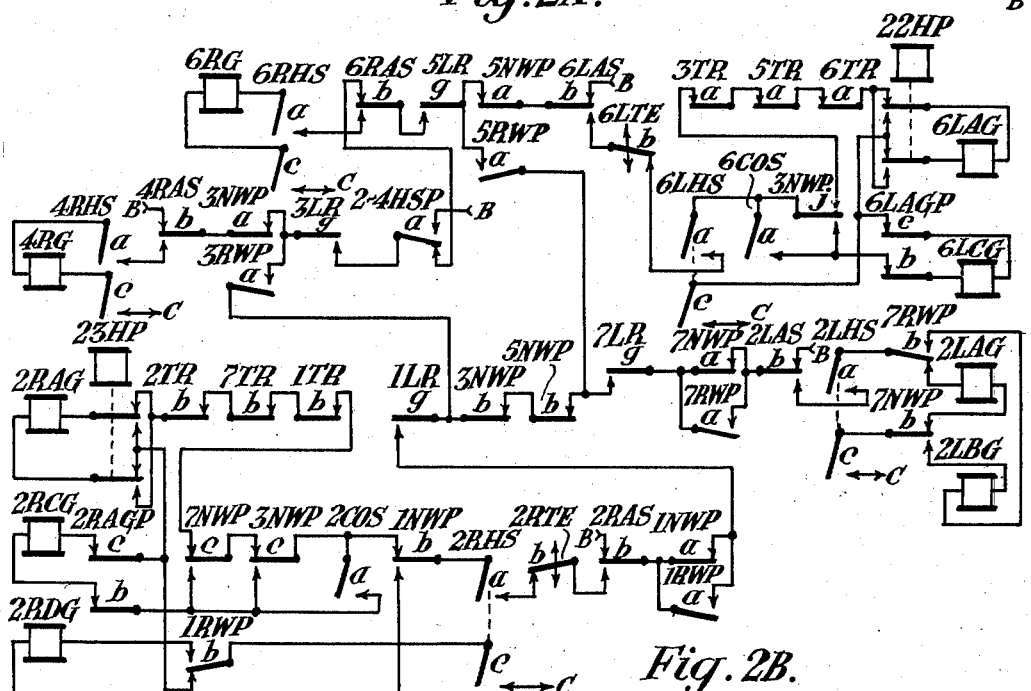
Fig. 2B.
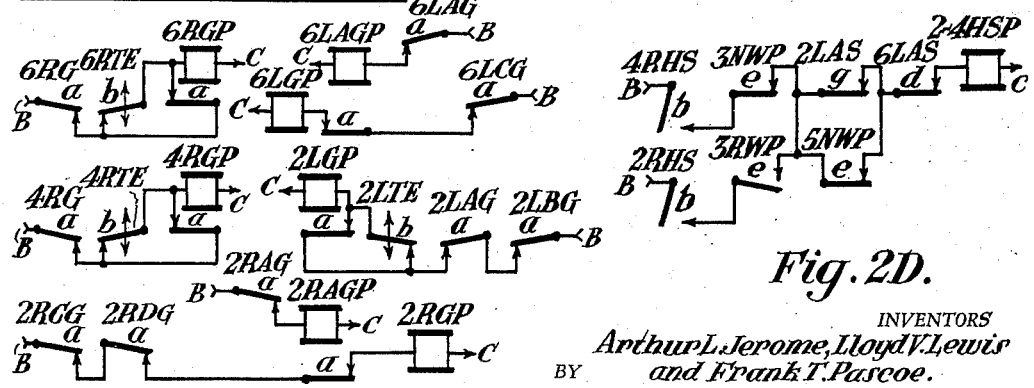
Fig. 2C.
Fig. 2D.
INVENTORS
Arthur L. Jerome, Lloyd V. Lewis
and Frank T. Pascoe.
BY
Their Attorney.

INVENTORS
Arthur L. Jerome, Lloyd V. Lewis
and Frank T. Pascoe.
Their Attorney.

INVENTORS
Arthur L. Jerome,
Lloyd V. Lewis and
Frank T. Pascoe.
BY
Their Attorney.

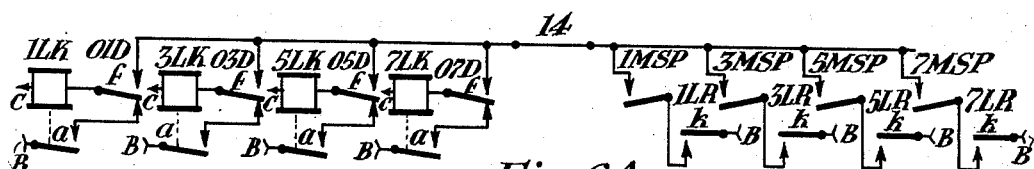
Fig.6A.
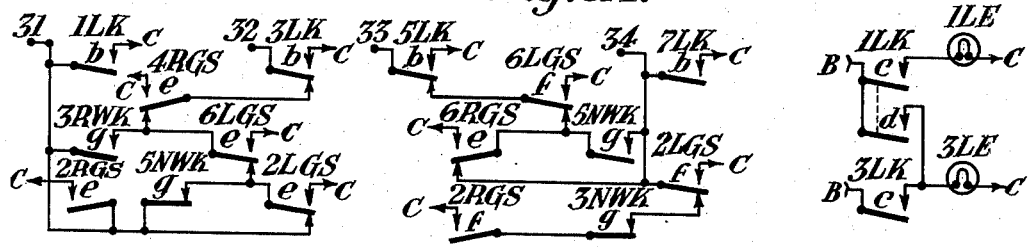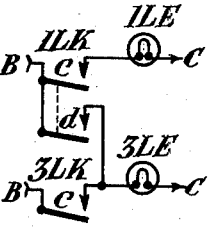
Fig.6B.    Fig.7.
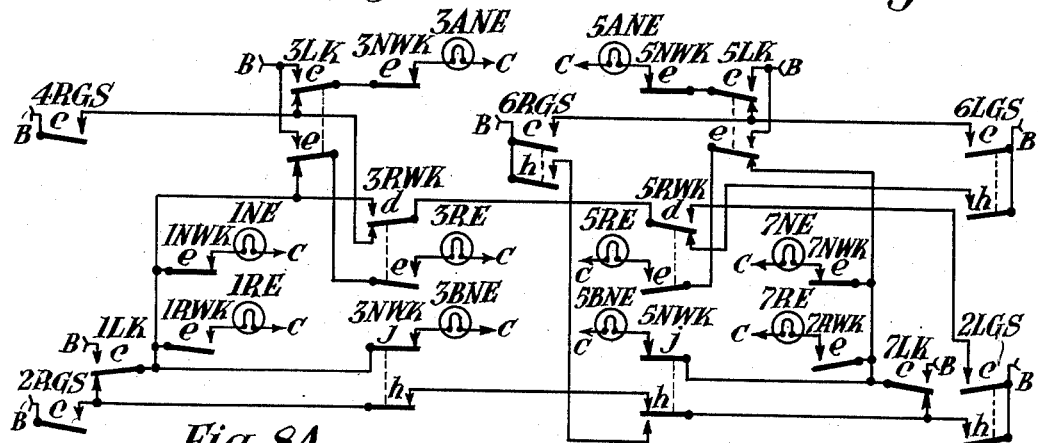
Fig.8A.
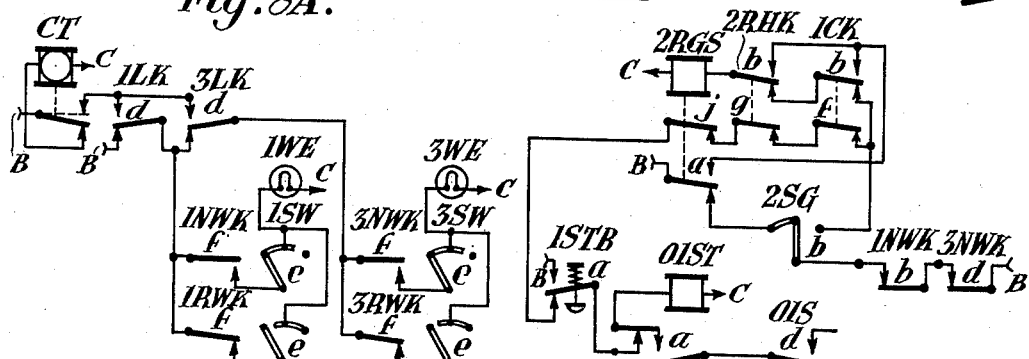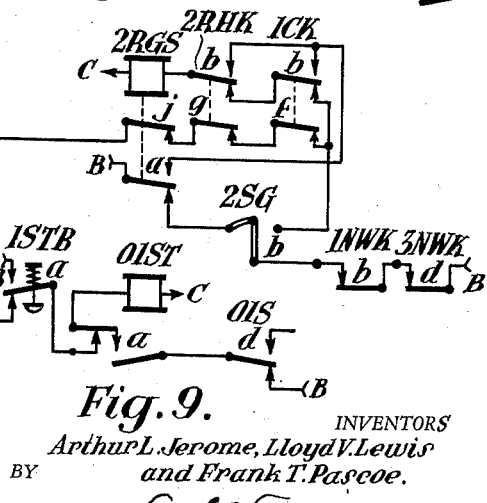
Fig.8B.    Fig.9.

Patented Apr. 15, 1952

2,592,704

UNITED STATES PATENT OFFICE 2,592,704

CENTRALIZED TRAFFIC CONTROL SYSTEM OF THE CODE TYPE FOR THE CONTROL OF INTERLOCKED TRACK SWITCHES AND RAILWAY SIGNALS

Arthur L. Jerome, Edgewood, Lloyd V. Lewis, Pittsburgh, and Frank T. Pascoe, Carnegie, Pa., assignors to Westinghouse Air Brake Company, a corporation of Pennsylvania Application February 23, 1946, Serial No. 649,598

47 Claims. (Cl. 246—3)

Our invention relates to centralized traffic control systems for railroads, and more particularly, to railway traffic controlling apparatus for the control of electrically interlocked track switches and railway signals from a control office.

Our invention is particularly adapted for use in connection with a selective communication system of the code type, such, for example, as the remote control system shown in Letters Patent of the United States, No. 2,229,249, issued January 21, 1941, to Lloyd V. Lewis, or a modification thereof shown in an application for Letters Patent of the United States, Serial No. 496,907, filed July 31, 1943, by Arthur P. Jackel, for Remote Control Systems, now Patent No. 2,411,375, issued Nov. 19, 1946, which system is described in a publication entitled "Manual No. 506-A" of The Union Switch and Signal Company, of Swissvale, Pa.

In remote control systems of this type, the components are assembled in the form of individual storage units each identified by a selective code call. Each storage unit in the field is adapted to control and indicate a group of traffic governing devices, such as a power operated track switch and the railway signals which govern traffic movements over the switch, and is linked, by means of its code call, with a corresponding storage unit in the office control machine which governs the transmission of control codes for governing the operation of the switches and signals in accordance with the positions of their control levers when set into operation by pressing a code starting button to select the code call.

Each office storage unit also includes a group of indication stick relays which respond to indication codes transmitted by the station storage unit having the same code call, to indicate the condition of the switch and signals of the corresponding group and for also indicating the condition of one or more track sections. Furthermore, the system is arranged to transmit the codes one at a time over a single line circuit, without interference, codes originating at the same time, or while the line circuit is in use, being transmitted one at a time in a given order of code superiority.

The principal object of our invention is to facilitate the control of large interlocking plants, particularly of those on multiple track roads where due to the number of track switches involved, the clearing of a signal for a particular route may require the transmission of a series of codes in order to align the track switches controlled by different storage units as required for the desired route.

One object of our invention is to insure that under these circumstances the code for clearing the signal will be the last of the series to be transmitted, regardless of the order of superiority of the different codes, and in this respect, our invention is an improvement upon that disclosed in Letters Patent of the United States, No. 2,343,784, issued March 7, 1944, to Ronald A. McCann and Lloyd V. Lewis, for Centralized Traffic Control Systems, and also upon that disclosed in an application for Letters Patent of the United States, Serial No. 623,142, filed October 18, 1945, by Arthur P. Jackel, for Remote Control Systems, which issued as Patent No. 2,442,603, on June 1, 1948.

Our invention includes improved means for electrically interlocking the switch and signal levers at the office in accordance with trackway conditions as reflected by the code controlled indication relays of the communication system, so as to render the control codes transmitted by the various storage units ineffective under certain conditions to change the positions of the switch and signal control relays which they are adapted to control.

A feature of our invention is the provision of a system of route check relays controlled by the signal levers, having pick-up circuits controlled over a route circuit network conforming to the track layout, by means of which each route check relay may be energized in response to the reversal of the associated signal lever only if certain of the switch indication relays are energized, thereby indicating that a route governed by the signal which such lever controls is available, and that no conflicting route is established, and further, that the indicated position of each switch of such route corresponds to the last transmitted code for the control thereof. The route check relays govern the transmission of code elements for controlling the track switches in such a manner that a switch control code will contain elements effective to cause the operation of the track switch to reverse or to normal only if transmitted when the route check relays for all routes over the switch are released. Unless the code is transmitted when the controlling route check relays are released, the switch control elements of the code are of a neutral character to which the switch control relay in the field is non-responsive.

To include elements for clearing a signal in a code, in response to the reversal of a signal lever, the corresponding route check relay must be energized, this relay becoming energized when the signal lever is reversed, over a route circuit prepared by the switch indication relays which corresponds to the route established by the track switches. After the corresponding code starting relay becomes energized to store this code for transmission, the route check relay is held energized over a stick circuit, regardless of subsequent switch or signal lever manipulation, until a return indication code is received which indicates that the control relay for the signal cleared by the preceding control code has been restored to its normal position and that conditions in the field are such that the route may properly be cancelled. Furthermore, the apparatus is arranged so as to insure that any signal which has been cleared cannot be put to stop by the operation of any lever other than its control lever.

The control code for clearing a signal in any case is capable of being initiated only when a route governed by the signal is established, as manifested by the energization of the corresponding route check relay. This code may be initiated by the operation of the usual code starting button, after the operator has noted by observation of the indication lamps provided, that the route established is the one desired. In a modification of our invention, means are provided whereby the signal clearing code is initiated automatically, provided the signal lever has been reversed, as soon as the route becomes established as indicated by the closing of the route circuit.

In accordance with another feature of our invention each code controlled signal control relay in the field is restored to normal when a train enters the controlling track section and is thereupon rendered non-responsive to codes for reclearing the signal until a code indicating the occupancy of the section has been transmitted to the office, after which the control relay may be reoperated even though the section is still occupied, as required for the clearing of a signal for "call-on" movement, for example. At the office, the reception of this track occupied indication is effective to prevent the further transmission of code elements for clearing the signal even though the controlling signal lever remains in its reverse position. To reclear the signal, the signal lever must first be restored to normal to correspond with the indicated condition of the signal, and then must be reversed again. One advantage of this arrangement is that it removes any uncertainty which may arise, in the event the transmission of code indications is delayed for any reason, as to whether the signal control element of a code transmitted at about the time a train is passing the signal should be one for holding it at clear, on the assumption that the train has not yet passed the signal, or should be one for holding the signal at stop, on the assumption that the train will have passed the signal by the time the code is received. Another advantage is that these provisions make it practicable to assign the various steps of the control codes transmitted by any storage unit to the control of wholly unrelated devices, with the assurance that each device may be operated at any time by a code which includes steps for controlling other devices, but without causing the undesired or improper operation of such devices.

One form of our invention includes a novel illuminated track diagram and control panel in which all of the indication lamps are normally  route is established, route lamps itches and by the route check relays are lighted in the tracks of the diagram, the course of the route being indicated by the lighting of a corresponding series of route lamps.

An optional feature of our invention is the provision of lock indication relays at the office controlled by the code system for separately indicating the locked condition of each of the track switches by the lighting of suitable lamps, and for the control of the route locking circuits at the office so as to maintain each route locked after it has been entered by a train until indications are received that the switches of the route are unlocked. In accordance with this feature of our invention the transmission of a code for operating a switch is possible only when the switch is free to respond, and as a train moves through a route, the apparatus for transmitting switch control codes is rendered effective section by section.

One advantage of this feature is that it provides the operator with additional information over that provided by the usual track occupancy lamps which enables him to avoid unecessary delays due to attempts to set up routes over switches which remain locked when the detector sections therefor are not occupied, due to faults in the wayside circuits, for example.

Other objects, purposes and features of our invention will be pointed out as the description proceeds.

Two forms of apparatus embodying our invention and various modifications thereof will now be described, and the novel features thereof will then be pointed out in claims.

Figure 1G:
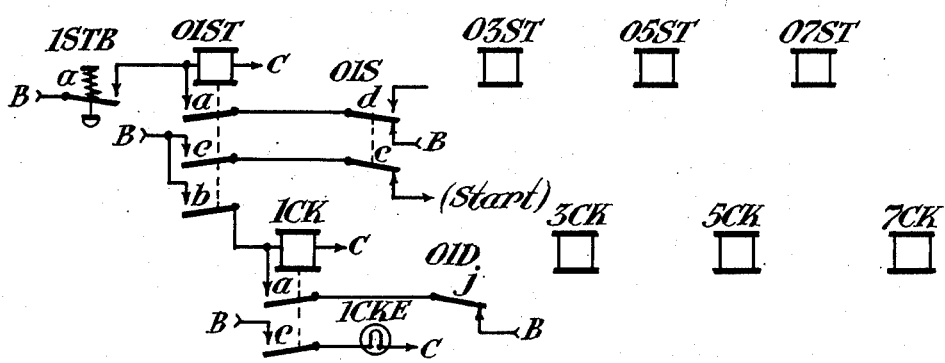
Figure 1H:
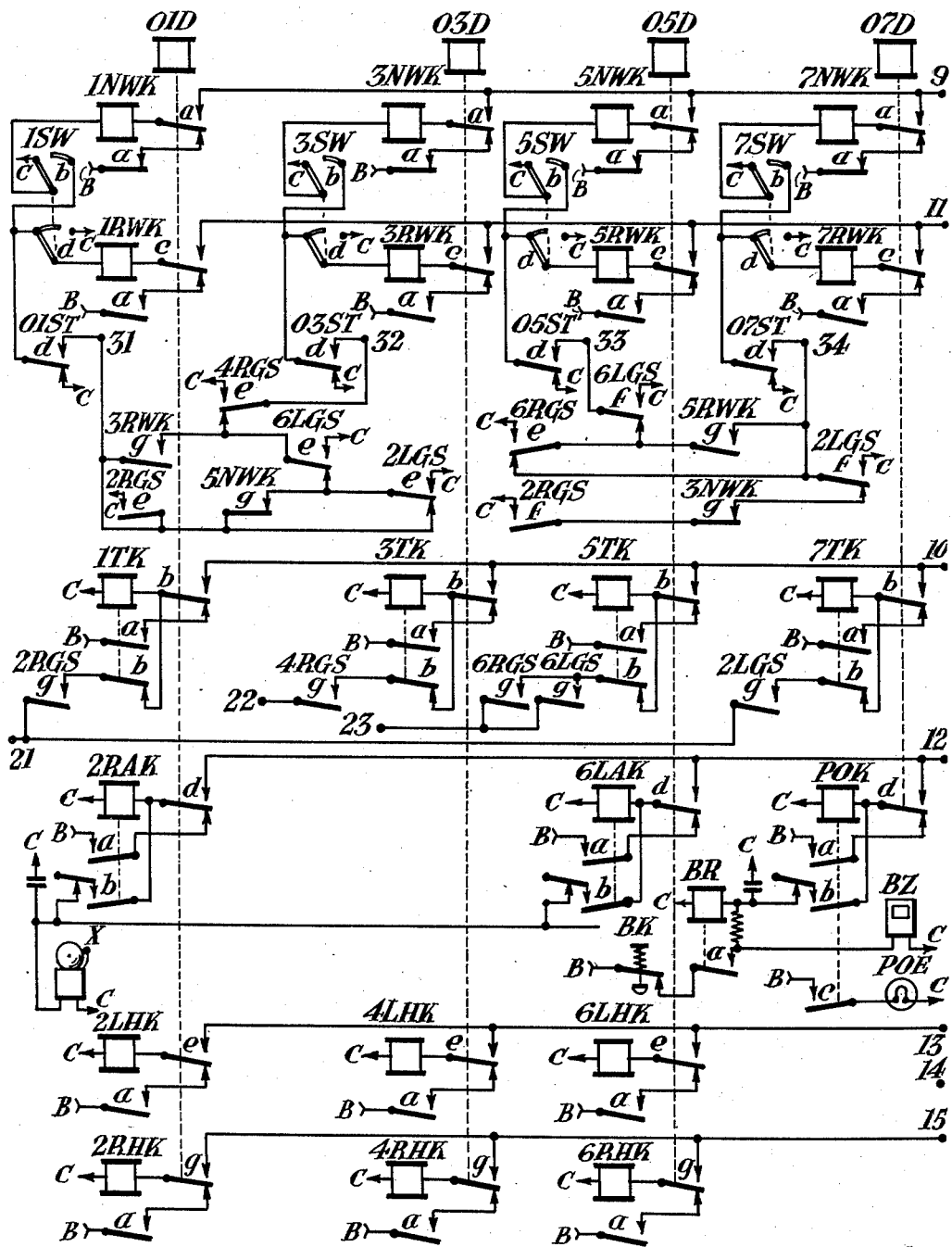
Figure 2E:
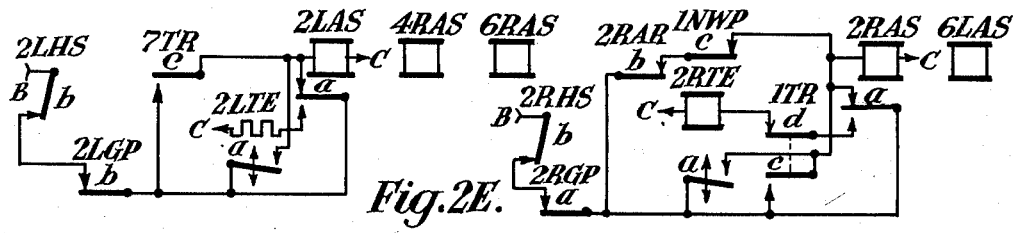
Figure 2F:
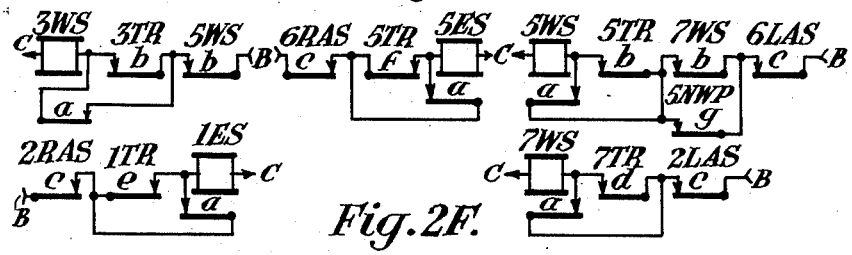
Figure 2G:
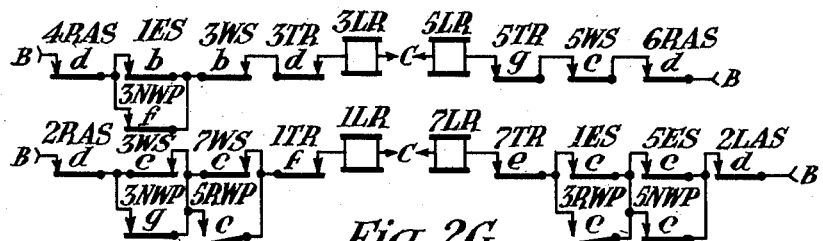
Figure 2H:
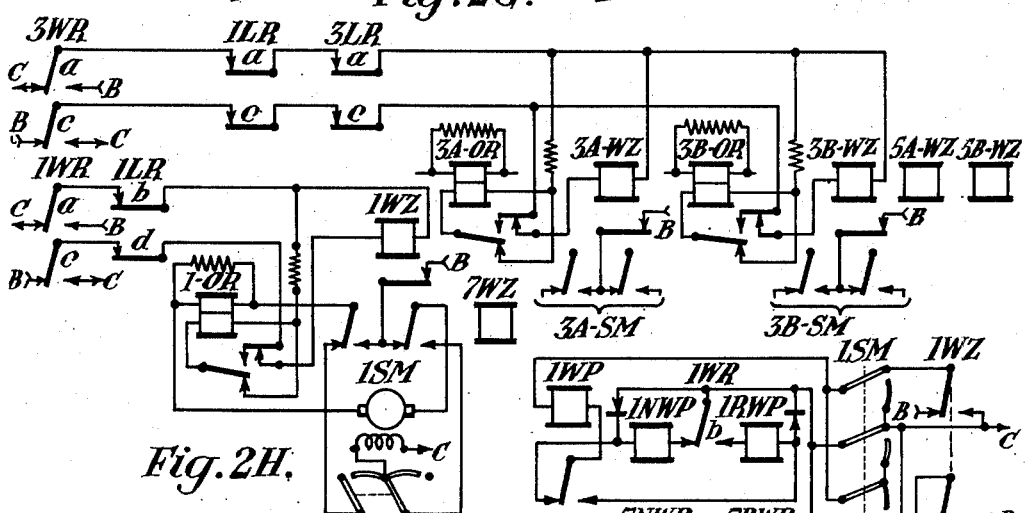
Figure 2J:
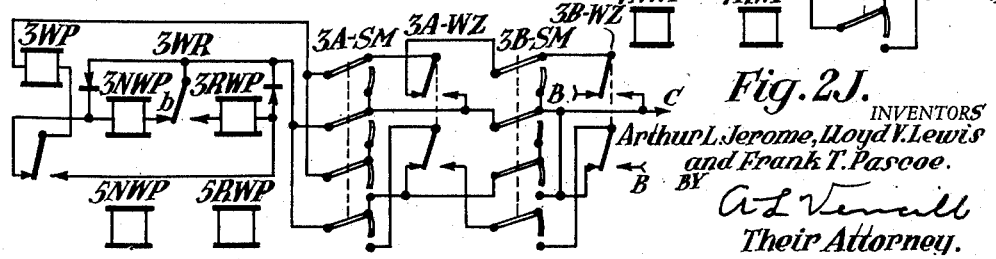
Figure 3A:
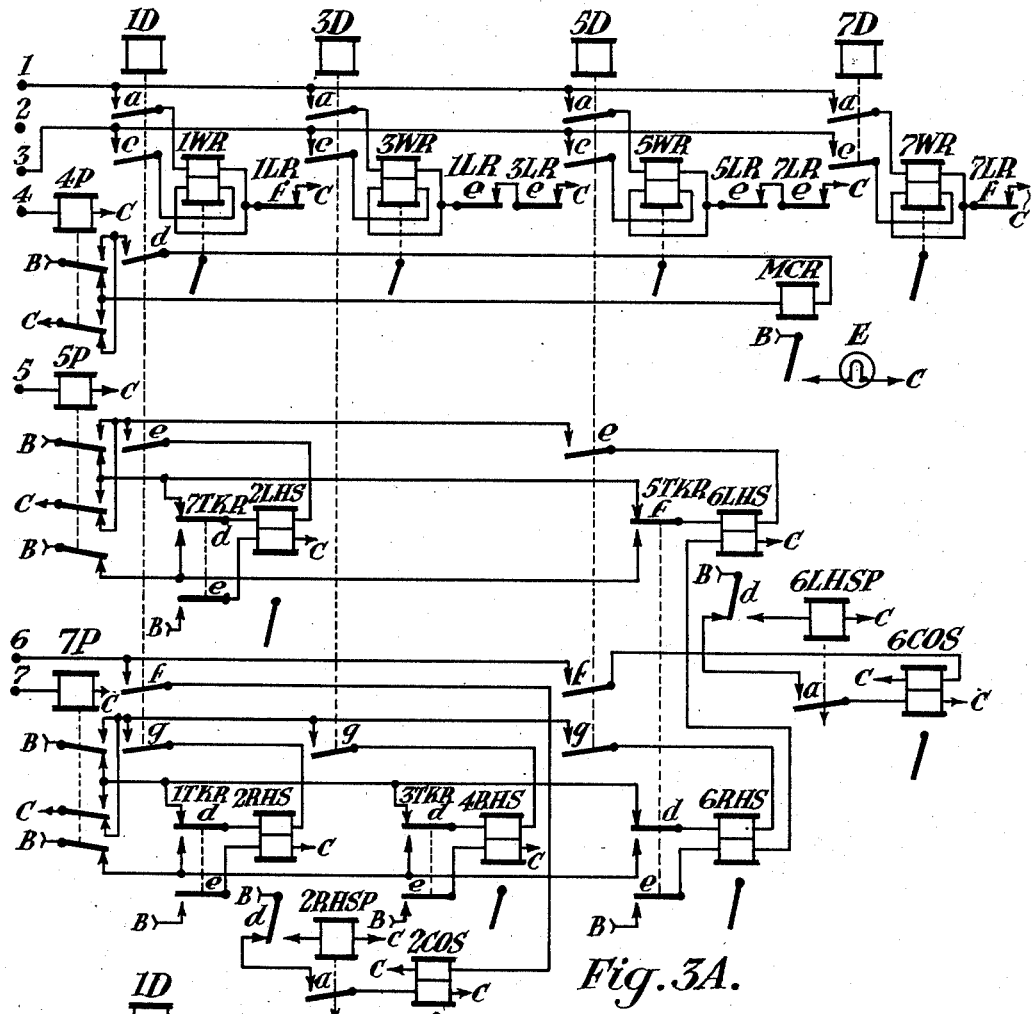
Figure 3B:
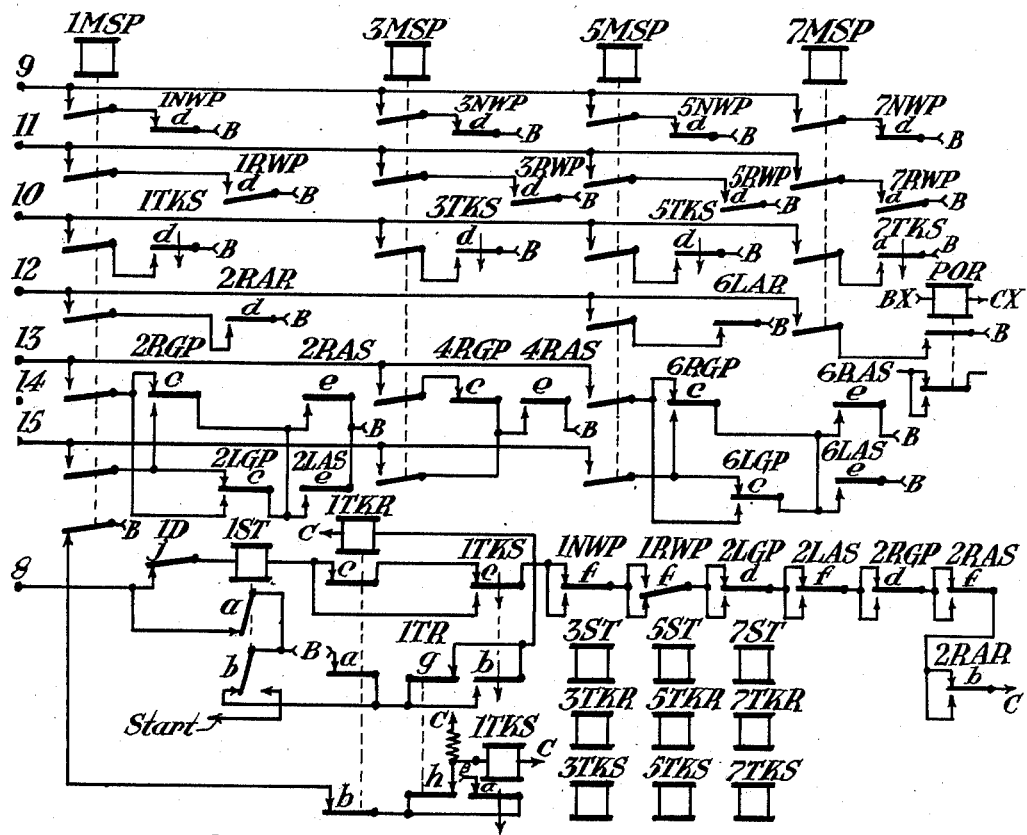

Referring to the accompanying drawings, Figs. 1A to 1H, inclusive, show the apparatus located at the control office, Figs. 2A to 2H, inclusive, together with Fig. 2J show the wayside circuits and apparatus, Fig. 2A also including a plan of the track layout chosen to illustrate our invention, and Figs. 3A and 3B show the station storage units of the communication system for controlling and for indicating the condition of the wayside apparatus. This group of drawings, taken together, illustrates one form of centralized traffic control system embodying our invention, in which the operator's control board, shown in Fig. 1A, is of a conventional type, comprising an illuminated diagram of the track layout of Fig. 2A, together with a series of individual control panels for the several storage units, each of which includes one or more control levers and a code starting button and various indication lamps controlled by the code system.

In this form of the apparatus it is to be understood that the code system is that shown in the above mentioned Jackel application, Serial No. 496,907, employing switch and signal control relays at the stations which are the stick polar type as shown herein in Fig. 3A, and having the station circuits for governing the transmission of indications arranged as shown in Fig. 3B.

Figure 4A:
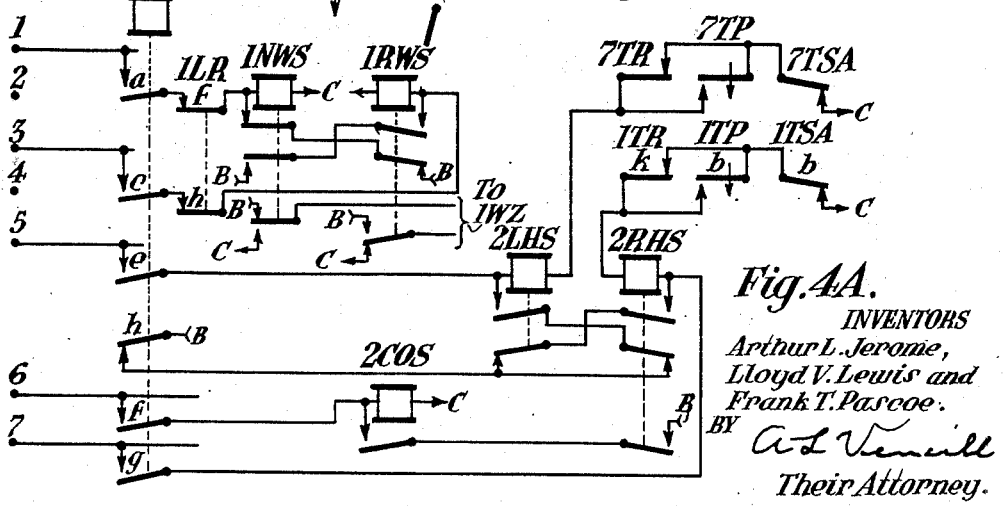
Figure 4B:
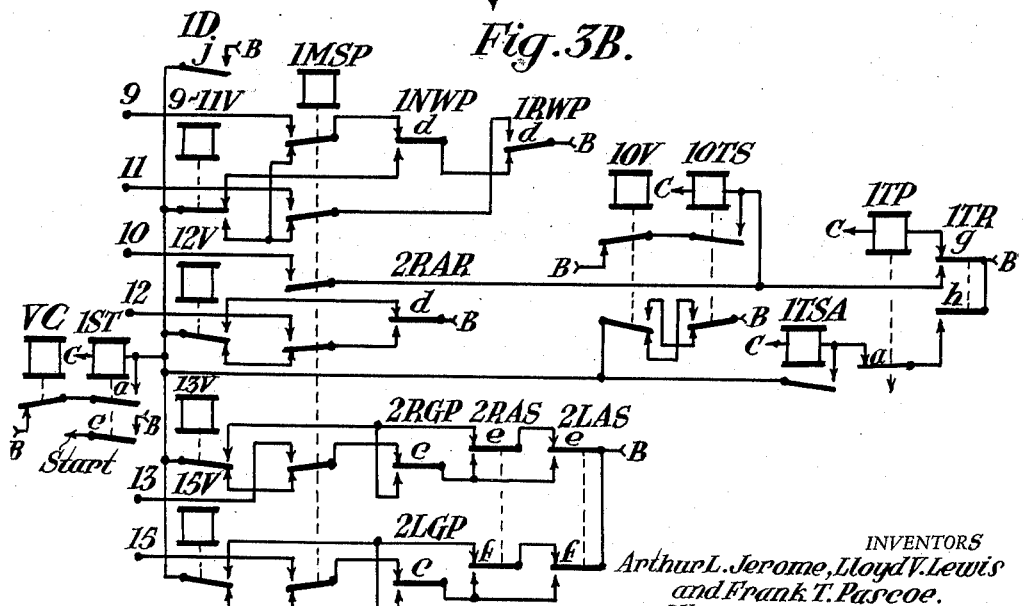

Figs. 4A and 4B illustrate a modification employing the communication system of the Lewis Patent No. 2,229,249, in which the switch and signal control relays are neutral stick relays as shown in Fig. 4A, and the circuits for governing the transmission of indications are arranged as shown in Fig. 4B. Each of the forms of our invention may employ either of the two code systems referred to, and when the system of Patent No. 2,229,249 is used, Figs. 4A and 4B replace Figs. 3A and 3B in the group of drawings being considered.

Figs. 5A to 5D, inclusive, illustrate a second form of our invention characterized by the provision of a novel form of track diagram having route lamps thereon for indicating the course of the various routes. In this form of our invention, the wayside apparatus is the same as for the first form, the office apparatus comprising Figs. 5A to 5D, inclusive, together with Fig. 1B and Figs. 1E to 1H, inclusive. That is, in this form the control board of Fig. 5A replaces that of Fig. 1A, and the lamp circuits of Figs. 5B, 5C and 5D replace those of Figs. 1C and 1D.

Figs. 6A and 6B, Fig. 7, and Figs. 8A and 8B show further modifications of the system of our invention to include therein provisions for indicating the locked condition of the track switches. In this modification the indication system includes the circuits of Fig. 6A, for controlling a series of lock indication relays LK, in addition to those of Figs. 1H and 3B or 4B, and the circuits of Fig. 6B replace those connected to wires 31—34 in Fig. 1H. When this modification is provided in the first form of the invention, having the control panel of Fig. 1A, lock indication lamps LE are provided as shown therein, controlled as in Fig. 7. In the second form of the invention having the control panel of Fig. 5A, the switch indication lamps are arranged so that they also indicate the switch locking by substituting Figs. 8A and 8B for Figs. 5B and 5D.

Fig. 9 comprises a modification of the route check relay circuits of Fig. 1B and of the starting relay circuits of Fig. 1G, comprising arrangements for effecting the initiation of a code for clearing the signal for a route automatically in response to the indication codes indicating that the route is established.

Similar reference characters refer to similar parts in each of the views.

To simplify the circuits, we have herein shown only the terminals of the sources of current for energizing the various relays, the reference character B designating the positive or supply terminal and the reference character C the negative or common return terminal of the local source of current, in each instance.

*The wayside circuits and apparatus*

Although the system of our invention is well adapted to the control of large and complicated track layouts, a relatively simple one, as shown in Fig. 2A, is deemed sufficient to illustrate our invention. This layout comprises the two main tracks of a double track railroad connected by the crossover switches 3AW—3BW and 5AW—5BW, the lower track also including two single switches 1W and 7W. Main line train movements over the tracks of the layout are governed by the high speed signals 2RA and 6LA, and other movements by the slow speed signals 2RC, 2RD, 2LA, 2LB, 4R, 6R, and 6LC, located as shown. The tracks are divided into sections by insulated joints to form the detector track sections 1T, 3T, 5T and 7T, each having the usual track circuit provided with a normally energized track relay 1TR, 3TR, etc. The track relays TR govern the signal circuits of Fig. 2B, the locking circuits of Figs. 2E, 2F and 2G, and also govern the transmission of indications of traffic conditions to the office in the manner shown in Figs. 3B and 4B. The track switches are arranged for power operation by the provision of suitable switch machines 1SM, 3ASM, etc., which are controllable under proper conditions as reflected by the switch locking relays LR of Fig. 2G, by polarized switch operating relays 1WZ, 3A—WZ, etc., over circuits arranged as shown in Fig. 2H. Each switch is also provided with a suitable overload relay OR, as shown, these circuits being arranged as shown and described in Letters Patent of the United States No. 2,124,601, issued July 26, 1938, to Norman F. Agnew et al., for Railway Switch Controlling Apparatus.

In Fig. 2H, and likewise in other views involving a plurality of similar sets of circuits only one set of each type is shown in detail. Thus it is to be understood that the circuits for relay 7WZ, for example, controlling switch 7W, are similar to those for relay 1WZ, and that those for the crossover switches 5A—5B are similar to those shown for the switches 3A—3B.

Figure 5A:
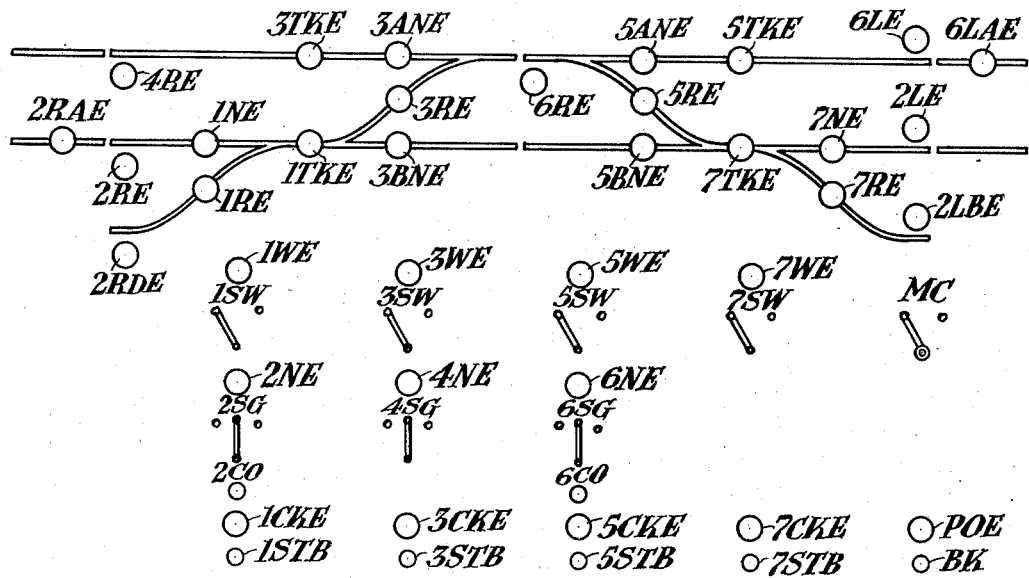

Each switch operating relay WZ in Fig. 2H, is controllable under proper locking conditions by a code controlled switch control relay, such as the relay 1WR, Fig. 3A, which is of the stick polar type, or alternatively, by a pair of neutral stick relays such as the relays 1NWS and 1RWS, Fig. 4A, the switch control relays being controlled by codes which reflect the positions of the corresponding switch levers, such as lever 1SW of Fig. 1A or 5A.

Each switch machine such as 1SM, 3A—SM or 3B—SM, together with the associated switch operating and control relays 1WZ and 1WR, or 3A—WZ, 3B—WZ and 3WR, as shown in Fig. 2J, controls a polarized switch indication relay or 3WP and a normal and a reverse repeating relay 1NWP and 1RWP, or 3NWP and 3RWP. The circuits of Fig. 2J are arranged as shown and described in Letters Patent of the United States No. 2,351,495, issued June 13, 1944, to Arthur E. Dodd, for Electrical Control Apparatus. Each switch repeating relay NWP or RWP when energized indicates that the associated switch or crossover, as the case may be, is locked in the normal or reverse position, respectively, and also that the associated switch operating and control relays are in the corresponding normal or reverse position. The switch repeating relays govern the signal circuits of Figs. 2B and 2D, the locking circuits of Figs. 2E, 2F and 2G, and also govern the transmission of indications of switch position to the office as shown in Figs. 3B and 4B.

Each of the signals of Fig. 2A is to be understood to be of the well-known searchlight type, having a three position mechanism identified by the reference character G prefixed by the designation of the signal, and is adapted to cause the signal to indicate caution or slow speed when energized in a normal direction, to indicate proceed when energized in a reverse direction, and to indicate stop when deenergized.

The signal mechanisms G are controlled over a signal circuit network conforming to the track layout and shown in Fig. 2B, to which they are connected by the operation of code controlled signal control relays such as the relays 2RHS and 2LHS, etc., of the polar stick type, shown in Fig. 3A, or alternatively, by the similarly designated relays of the neutral type shown in Fig. signal control relays such as the relays 2RHS being controlled by codes which reflect the position of the corresponding switch lever such as lever 2SG of Fig. 1A or 5A, provided the corresponding route check relay 2RGS or 2LGS of Fig. 1B is energized.

As will be clear from Fig. 2B, only the signal mechanisms 2RAG and 6LAG are arranged for three position control, the polarity of the current supplied thereto being controlled by the relays 23HP and 22HP respectively, which relays are controlled in the conventional manner by the signals in advance of signals 2RA and 6LA, by means not shown. Signals 2RC and 6LC are arranged to be governed by the code controlled relays 2COS and 6COS, Fig. 3A, to serve as "call-on" signals to admit trains to the main line routes when occupied.

The signal control relays 2RHS and 4RHS also control a repeating relay 2—4HSP, shown in Fig. 2D, which governs the route circuits of Fig. 2B as required in connection with the provision of the intermediate signal 6R.

Each signal mechanism G of Fig. 2B controls a stop indication repeating relay 2RGP, 2LGP, etc., shown in Fig. 2C, which relay is energized only when the signals of the corresponding group indicate stop. Each signal repeating relay such as 2RGP or 2LGP together with the associated signal control relay 2LHS or 2RHS controls an approach locking stick relay 2RAS or 2LAS, shown in Fig. 2E, in the manner described in the above mentioned McCann et al. Patent No. 2,343,784, and the clearing of each signal is made dependent upon the release of the associated approach locking relay. As will be clear from Fig. 2E, each approach locking relay such as relay 2RAS is released by the associated signal control relay 2RHS, when the latter is operated to prepare a circuit for clearing a signal. The release of the approach locking relay is checked by including a back contact thereof in the signal circuit, as illustrated in Fig. 2B, for example, by back contact b of relay 2RAS in the circuits for each of the mechanisms 2RAG, 2RCG and 2RDG. The opening of front contact b of relay 2RAS prevents the clearing of the opposing signal for the established route, such as signal 2LA, by disconnecting terminal B from the route circuit for its mechanism 2LAG.

The signal repeating relays RGP and LGP and the approach locking relays RAS and LAS also govern the transmission of signal indications by the code system as shown in Figs. 3B and 4B, so as to indicate whether the signal for the established route is at clear or at stop, and if at stop, whether or not the associated approach locking relay is energized.

Fig. 2F shows a series of directional stick relays ES and WS, designated section locking relays, which are controlled by the approach locking relays of Fig. 1E and co-operate therewith in the control of switch locking relays LR.

As shown in Fig. 2G, a switch locking relay LR is provided for each switch section. Each relay LR, when released, locks the switches in the corresponding section by opening the circuits for the switch operating relays WZ of Fig. 2H, and also opens the circuits for the switch control relays WR of Fig. 3A or for the corresponding relays NWS and RWS of Fig. 4A. Each such relay LR is held released by the track relay TR for the corresponding section to provide detector locking when the section is occupied. Relay 1LR, for example, when released, locks switch 1W and also the crossover switches 3AW and 3BW, the latter being also locked by relay 3LR when released.

When a signal control relay RHS or LHS is operated, the release of the associated approach locking relay RAS or LAS releases the locking relay LR for the first section of the established route, and also releases one or more of the section locking relays of Fig. 2F, which serve to release the locking relays LR of the succeeding sections of the route and to hold them released until the train occupying the route reaches the corresponding sections and the detector locking becomes effective. Considering the route from signal 2RA to signal 2LA, for example, it will be seen that relay 1LR is released to lock the switches in section 1T by the opening of contact d of relay 2RAS, and that the opening of contact c of relay 2RAS releases relay 1ES. Since contact c of relay 3RWP is open, the opening of contact c of relay 1ES releases relay 7LR to lock the switches in section 7T. If, however, the route from signal 2RC to signal 6R is set up, contact f of relay 3NWP is open and the opening of contact b of relay 1ES releases relay 3LR, and relay 7LR is not released.

When a train enters either of the routes mentioned, relay 1TR releases to hold relays 1LR and 1ES released, and by opening its contact g, Fig. 3B, releases a repeating relay 1TKR. The closing of back contact e of relay 1TKR, Fig. 3A, restores the signal control relay 2RHS to normal, opening its contacts a and c, in the circuits for mechanisms 2RAG and 2RCG shown in Fig. 2B. If signal 2RC has been cleared, this restores the signal to stop and causes relay 2RGP, Fig. 2C, to become energized. If signal 2RA has been cleared, it is put to stop by the opening of contact b of relay 1TR in the circuit for mechanism 2RAG, the release of which energizes relay 2RAGP, Fig. 2C, and thereby energizes relay 2RGP. Relay 2RAS, Fig. 2E, then picks up over back contact c of relay 1TR, and is held energized over its own front contact a after section 1T is vacated. Relay 1ES holds relay 7LR or 3LR released so long as the train occupies section 1T, relay 1LR becoming energized when the train vacates section 1T, while relay 7TR or 3TR, as the case may be, will hold relay 7LR or 3LR released until the second section of the route is vacated, each locking relay LR becoming energized when the train vacates its section.

When a signal is restored manually to stop by the operation of its control relay RHS or LHS to normal, the reenergization of the approach locking relay LAS or RAS is delayed for a suitable time interval by the operation of a time element relay such as relay 2LTE or 2RTE, Fig. 2E, which provides time or approach locking in accordance with the usual practice.

The code communication system

It has already been pointed out that the centralised traffic control system of our invention may employ either of two code systems, that of application Serial No. 496,907, of which the field storage units are illustrated in part in Figs. 3A and 3B, or that of Patent No. 2,229,249 of which the corresponding portions are shown in Figs. 4A and 4B. Both systems employ substantially similar apparatus at the office for governing the character of the control codes transmitted from the office and for controlling the indication relays which register the character of the received codes and Figs. 1F, 1G and 1H, showing these portions of the system, may therefore be taken to represent either system. For an understanding of our invention, it is deemed sufficient to point out that either of the communication systems mentioned may be arranged to provide seven code steps or channels, for the intermittent transmission of controls from the office to a selected storage unit in the field, as well as seven other channels for the transmission of indications from any of the field storage units to the office. The control channels are identified herein by the numbers 1 to 7, inclusive, and the indication channels by the numbers 9 to 15, inclusive. For simplicity, the code channels are represented herein by direct wire connections, such as would be used for the control and indication of apparatus in the vicinity of the control office, although the coding apparatus establishes the channels only one at a time over a single line circuit, but this may be disregarded and the operation may be more readily traced by assuming that terminals 1 to 7, in Fig. 1F, extend directly to terminals 1 to 7, in Fig. 3A or 4A, and that terminals 9 to 15, in Fig. 4A or 4B extend directly to terminals 9 to 15 in Fig. 1H. Terminal 2 represents an idle channel, not used herein, and channel 14 is used only in the modification shown in Fig. 6A.

Each control code transmitted from the office is initiated by the energization of a starting relay such as relay O1ST, Fig. 1G, of which one is provided in each office storage unit. Each starting relay may be energized by the operation of a starting button 1STB in the corresponding panel and when energized completes a starting circuit including its contact c to effect the initiation of the corresponding code as described in Patent No. 2,229,249. Each control code includes a distinctive code call by which a selector relay such as relay O1S, Fig. 1F, in the office storage unit and a delivery relay such as relay 1D, Fig. 3A or 4A, in the corresponding field storage unit, are energized, to establish channels 1–7 to position a particular group of control relays at the station in accordance with the condition of energization of the channels as determined by the positions of the levers of the corresponding office panel. The manner in which the various functions have been assigned to the different code steps or channels and to the different panels and storage units will be obvious from a consideration of Figs. 1F and 3B.

In the code system of application Serial No. 496,907, the indication codes are initiated by the release of normally energized starting relays such as the relay 1ST, Fig. 3B, in the station storage unit. Relay 1ST is released in response to a change in position of any of the indicating relays which govern the unit, and also when the delivery relay 1D is operated by a control code. A return indication code therefore follows each control code, regardless of whether or not the positions of the controlled devices are changed. Each indication code includes a distinctive code call by which a selector relay, not shown, and a repeating relay, such as relay 1MSP, Fig. 3B, in the station storage unit, and also a delivery relay O1D, Fig. 1H, in the corresponding office storage unit, are energized to establish the indication channels 9–15, and thereby effect the selective energization of the indication stick relays 1NWK, 1RWK, etc. of the office unit in accordance with the condition of energization of the channels as reflected by the positions of the indicating relays assigned to the corresponding station storage unit.

In the system of Patent No. 2,229,249, as illustrated in Fig. 4B, the circuits for energizing the channels 9–15 are similar to those above described, only one of the relays MSP being shown, for simplicity, but the starting circuits are differently arranged. In this system the starting relay 1ST is normally deenergized, and is picked up by relay 1D, or by any indication relay which changes its position, over a circuit which as shown is in most instances a branch of the circuit by which the corresponding one of the channels 9–15 is energized. At the end of each indicating code a control relay VC in the station unit is momentarily energized, and connects the pick-up circuits for a series of stick relays 9—11V, 10V, etc., to the correspondingly numbered channels 9, 10, 11, etc., and at the same time opens the stick circuits for these relays, as shown and described in the patent. It is to be understood that when relay VC operates, the relays V are actuated to their energized or released positions as required to open the circuit for the starting relay, provided the positions of the indicating relays at the station did not change during the transmission of the code and correspond with the positions to which the office indication relays have been operated.

*The office circuits and apparatus for governing the code system*

The transmission of control codes is governed in accordance with wayside conditions by the indication relays of Fig. 1H as well as by the control levers, and referring to Figs. 1H and 3B, it will be seen that the relays controlled over channels 9 and 11, such as relays 1NWK and 1RWK, are normal and reverse switch indication relays which reflect the position of the corresponding track switch 1W and of the control and operating relays 1WR and 1WZ therefor. Each normal or reverse switch indication relay is adapted to be picked up by code over channel 9 or 11, and is held energized locally after the termination of the code by a stick circuit extending from terminal B at its front contact a, over a back contact of the delivery relay through its winding to terminal C at contact b or d of the associated switch lever, such as lever 1SW, provided the lever position corresponds with the indicated position of the switch. If the switch lever is moved to its opposite position, the circuit for the energized indication relay is extended to include back contact d of the associated code starting relay, such as relay O1ST, so that when the starting relay is operated to initiate a code for changing the position of the switch, the energized indication relay is released to cancel the switch indication. Thus the normal indication relay NWK is released by a "switch reverse" control code, and the reverse indication relay RWK by a "switch normal" control code, and the energization of either of these relays indicates the switch position registered by an indication code which followed the last transmitted control code for operating the switch. In this respect the circuits function like those of the McCann et al. Patent No. 2,343,784, hereinbefore referred to, but as shown herein, in Fig. 1H, and also in part, in Fig. 6B, they are modified in accordance with a feature of our invention by the provision of additional connections from the left-hand terminals of the windings of relays NWK and RWK over contacts b or d of the associated switch levers, front contacts d of the associated starting relays ST and wires 31, 32, 33 and 34 to terminal C at the front contacts e or f of the route check relays RGS or LGS. The circuits which control the route check relays RGS and LGS are shown in Fig. 1B, and the circuits which include their contacts e and f, as shown in Fig. 1H or 6B, constitute a novel arrangement for insuring that the energized indication relays for the switches of a route are held energized while control codes are stored for transmission or are being transmitted. These circuits serve to prevent the release of the switch indication relays if an attempt is made to operate any switch included in an established route at a time when the route check relay RGS or LGS for the signal governing traffic movements over such route is energized.

In Fig. 1F, back contacts c of the switch indication relays are included in the circuits over which the switch control channels 1 and 3 are energized in accordance with the positions of the contacts a of the switch levers, so that a cancellation of the switch indication is necessary in order to render the switch control elements of a code effective to change the position of the switch control relay WR, Fig. 3A, which such elements govern. Otherwise channels 1 and 3 are both de-energized in a code transmitted when a switch lever and its control relay WR occupy dissimilar positions, and relay WR is not operated. This is also true of the neutral switch control relays 1NWS and 1RWS of Fig. 4A, the circuits for which differ from those for the similarly designated relays of Patent No. 2,229,249 in that relay 1NWS is not released by a control code unless channel 3 is energized, nor is relay 1RWS released unless channel 1 is energized.

Referring now to Fig. 1B, it will be seen that front contacts b and d of the switch indication relays are so interconnected that when closed they form route circuits, there being one such circuit conforming to each route through the track layout of Fig. 2A. It will also be seen that when any signal lever such as lever 2G is operated to its right-hand or left-hand reverse position, with a route circuit established, the corresponding route check relay 2RGS or 2LGS is connected to the route circuit over the signal lever contact b or d and becomes energized and in turn holds energized the switch indication relays for the switches of the corresponding route. It follows that the energization of channel 1 or 3 to operate a track switch away from its existing position is possible only when the route check relay for each route over the switch is released.

Figure 5B:
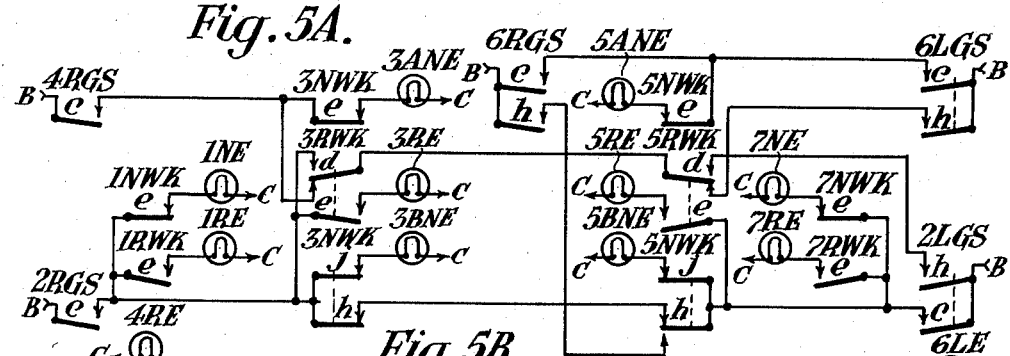
Figure 5C:
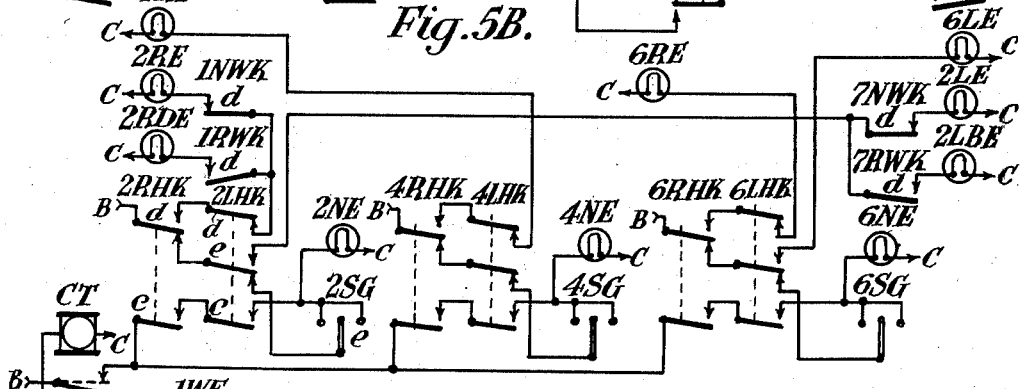
Figure 5D:
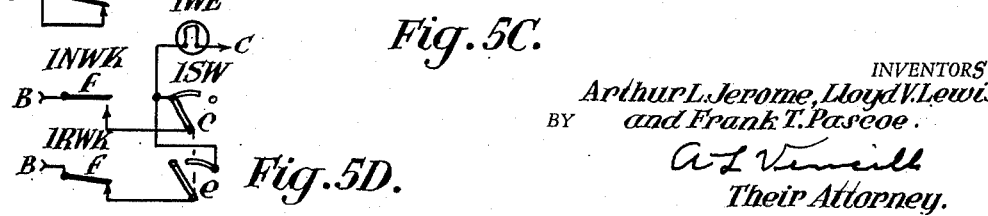

Visual indications of the condition of the switch indication relays are provided in the control board of Fig. 1A by lamps such as 1NE and 1RE mounted above the switch levers and energized over contacts e of the switch indication relays as shown in Fig. 1D. When the control board of Fig. 5A is used, these lamps are mounted in the track diagram and are controlled by the route check relays as shown in Fig. 5B or 8A so that they are lighted to indicate the course of an established route and are consequently not available to indicate the response of a track switch to a switch control code received when the route check relays are released. In Fig. 5A, a red lamp such as lamp 1WE is mounted above each switch lever which is lighted by the operation of the circuits of Fig. 5D or 8B when the switch lever is out of correspondence with the indicated position of the switch. The switch indication relays also have contacts for selecting purposes in the circuits for the signal indication lamps on the track diagram, shown in Fig. 5C, in this form of the apparatus.

Considering now the remaining indications relays of Fig. 1H, the relays 1TK, 3TK, etc. are track indication relays controlled over channel 10 to light red lamps 1TKE, etc., in the track diagram, to indicate when the corresponding track sections are occupied, the lamp circuits being shown in Fig. 1E. Storage of the detector section indications is provided, and when, for example, the track relay 1TR of Fig. 2A releases, it opens its contacts g and h, Fig. 3B, to release a repeating relay 1TKR and a storage relay 1TKS, and these relays in turn release the starting relay 1ST of the station storage unit to initiate the transmission of an indication code in which channel 10 is energized over back contact d of relay 1TKS to energize relay 1TK and light lamp 1TKE. Relay 1ST remains released until after the indication code which it controls is initiated, and by opening its left-hand contact b, relay 1ST holds relay 1TKR released until relay 1ST is reenergized, while the opening of contact b of relay 1TKR holds relay 1TKS released until after the code is initiated and relay 1MSP is thereby energized, after which relay 1TKS is held released by relay 1MSP until the code indicating the occupancy of the controlling track section 1T is fully transmitted, and also by relay 1TR until the section is vacated. It will be seen that in accordance with this arrangement the track occupied indication is "stored" by relay 1TKS to insure its transmission in the first code transmitted by the unit, even though its transmission is delayed until after section 1T has been vacated.

In the alternative form of Fig. 4B, the indication of the occupancy of the detector sections, such as section 1T, is stored by relay 1OTS, as described in Patent No. 2,229,249.

The relays 2RAK and 6LAK of Fig. 1H are approach indication relays controlled over channel 12 by the approach relays 2RAR and 6LAR of Fig. 2A to indicate the occupancy of the corresponding approach sections by lighting of track diagram lamps such as lamp 2RAE, Fig. 1E, and also by the momentary sounding of a bell X, shown in Fig. 1H. Relay POK is a "power off" indication relay controlled over channel 12 by a relay POR, Fig. 3B, which relay is normally energized by connections to terminals BX and CX of the primary source of power at the station. The release of relay POR indicates the loss of the primary power supply by the lighting of lamp POE of Fig. 1H, and by the operation of a buzzer BZ, controlled by a stick relay BR so that the buzzer continues to sound following the energization of relay BR until acknowledged by the operation of a key BK.

The relays controlled over channels 13 and 15 are signal indication relays controlled by the signal repeating relays RGP and LGP of Fig. 2C and by the approach locking relays RAS and LAS of Fig. 2E. Relay 2RHK in Fig. 1H, for example, is energized, and relay 2LHK is held released by the release of relays 2RGP and 2RAS when one of the signals 2RA, 2RC or 2RD is cleared, and in Fig. 3B, terminal B at back contact e of relay 2RAS is connected to channel 15 over back contact c of relay 2RGP or front contact c of relay 2LGP, but is disconnected from channel 13 by the opening of front contact c of relay 2RGP. Similarly, relay 2LHK is energized, and relay 2RHK is held released by the release of relays 2LGP and 2LAS, when signal 2LA or 2LB is cleared. The stop signal indication is thus transmitted by deenergizing both channels 13 and 15, and the clear signal indication by energizing one or the other. In addition, a distinctive approach locked indication may be transmitted by energizing both channels 13 and 15, as occurs, for example, when relay 2RAS or 2LAS is released and the signal fails to clear, or when a signal is returned manually to stop and the approach locking relay remains released. The clear signal indications are displayed by steadily lighting a green lamp such as 2LE or 2RE which in Fig. 1A is mounted above the signal lever and controlled as in Fig. 1C, and as shown by the circuits, these lamps are arranged to be energized at times over the contacts of a continuously operating interrupter relay CT so as to flash periodically, to indicate the energization of the associated route check relays 2RGS and 2LGS. In Fig. 5A, the green lamps, such as 2LE and 2RE, are mounted on the track diagram and controlled as in Fig. 5C, and the flashing indications are not provided in view of the fact that the lamps of Fig. 5B indicate the condition of the route check relays. The stop indication is displayed by steadily lighting, and the approach locked indication by flashing, a red lamp 2NE mounted above the signal lever. In Fig. 1C lamp 2NE is normally energized, while in Fig. 5C, it is normally dark, its circuit being open at contact e of the signal lever when this lever occupies its normal position.

The signal indication relays RHK and LHK also govern the route check relays RGS and LGS of Fig. 1B and the call-on relays COR of Fig. 1F, as hereinafter described.

In the alternative code system of Fig. 4B, channels 13 and 15 are similarly controlled, but the circuits differ from those of Fig. 1B principally in the provision of relays 13V and 15V which pick up or release in response to the transmission of a code to govern the circuit for the starting relay 1ST as explained in Patent No. 2,229,249.

Channel 14 is used only in the modification of Fig. 6A, where a series of lock indication relays LK are controlled over this channel to indicate the condition of the switch locking relays LR of Fig. 2G.

In each form of our invention a code indicator relay such as 1CK, Fig. 1G, is provided in each office storage unit, which is picked up by the starting relay of the unit whenever a control code is stored for transmission by the unit, and is held energized by the associated delivery relay O1D until a return indication code is received. During this period, a code indicator lamp 1CKE is lighted by relay 1CK. These lamps provide additional information as to the operation of the system of value to the operator, particularly in cases in which a control code is followed by a return indication code indicating no change in the positions of the controlled devices. The relays CK also govern the transmission of signal control codes as will now be described.

It has already been explained that code elements effective to operate a track switch are transmitted only when each route check relay of Fig. 1B which governs a route over the switch is in its released position, and that each such relay 2RGS or 2LGS becomes energized in response to the reversal of the associated signal lever 2SG, provided a route circuit is established in Fig. 1B, for a route governed by a signal which such lever controls. If the route check relay becomes energized, as indicated by the flashing of the signal indication lamp 2LE or 2RE in Fig. 1A or the lighting of a series of route lamps in Fig. 5A, a signal clearing code may be initiated by operating the associated starting button and relay CK then disconnects the energized route check relay from the route circuit but holds it energized over a stick circuit as shown in Fig. 1B. In the first form of the apparatus, contact e of relay 1CK, Fig. 1C, opens to discontinue the flashing of the signal indication lamp.

When this control code is transmitted, channel 5 or 7 is connected to terminal B as shown in Fig. 1F, over the left-hand or right-hand contact a of lever 2SG, back contact a or b of a relay 1TKA, hereinafter described, and front contact d of relay 2RGS or 2LGS, causing the signal control relay 2LHS or 2RHS of Fig. 3A to assume its reverse position to effect the release of the approach locking relay and the clearing of the signal as already described.

Assuming that relay 2RHS has been reversed, for example, the return indication code by which relay 1CK is released causes relay 2RHK to become energized to maintain relay 2RGS energized over its stick circuit after relay 1CK releases. That is to say, if relay 2RHS reverses, relay 2RAS releases, and the return indication code will indicate either the clear or the approach locked condition of the signal by energizing relay 2RHK alone or along with relay 2LHK, as already explained.

It will be seen therefore that after a signal clearing code for reversing a signal control relay such as 2RHS has been stored for transmission, the route check relay 2RGS is locked energized, and can be released only after an indication code has been received which indicates that relay 2RHS has been restored to its normal position. The route check relay when energized maintains the route circuit established by reason of the connections to wires 31—34 in Fig. 1H, to prevent a change in route, and is releasable only when it is proper to change the route, since the code which indicates that the signal control relay is in its normal position also indicates that the signals such relay controls are at stop and that their approach locking relay is energized.

Centralized traffic control systems of the type shown usually include a maintainer's call signal, and this is provided herein by controlling a polar stick relay MCR, Fig. 3A, over channel 4 by which the operator may light a lamp E by reversing a lever MC, Fig. 1F. This lever is assigned to the storage unit having the starting button 1STB, but for convenience lever MC is of the push-turn type, having an auxiliary contact a connected in multiple with the contact of button 1STB, which contact closes momentarily to energize the starting relay O1ST whenever contact c of lever MC is moved from one operative position to the other.

Each control code initiated by the operation of lever MC will therefore include elements for the control of switch 1W and also for the control of the signals governed by lever 2SG. It is obvious that switch controls cannot be issued improperly by the operation of lever MC and this is also true of the signal controls, due to provisions which will now be described.

Assuming that relay 2RHS has been reversed by the energization of channel 7, to clear one of the signals which relay 2RHS controls, for an approaching train, if lever 2SG is not moved from its right-hand position, channel 7 will be energized in each succeeding code transmitted by the same unit prior to the time the train enters section 1T, thereby maintaining relay 2RHS reversed to hold the signal at clear until the train passes it.

When the train enters section 1T, relays 1TKR, 1TKS and 1ST, Fig. 3B, are released by relay 1TR to initiate the transmission of a track occupied indication code, as already described. The closing of back contact e of relay 1TKR energizes the lower winding of relay 2RHS, restoring relay 2RHS to normal. Relay 1TKR remains released from the time section 1T becomes occupied until a code indicating its occupancy is transmitted, and the dropping of contact d of relay 1TKR prevents the energization of the upper winding of relay 2RHS in a direction tending to reverse relay 2RHS, in the event control codes are received with channel 7 energized, during this period.

When the track occupied indication is transmitted, relay 1TK becomes energized to light lamp 1TKE as already described, since relay 2RHS has been restored to normal, and this code will be effective to release relay 2RHK to indicate the return of the signal to stop. When relay 1TK is first energized, a circuit is closed momentarily from channel 10, Fig. 1H, over back contact b of relay 1TK and front contact g of relay 2RGS to wire 21, and thence in Fig. 1F, through the upper winding of relay 1—7TKA to terminal C. Relay 1—7TKA therefore picks up and establishes a stick circuit at its front contact b extending to terminal B at the reverse contact a of lever 2SG and disconnects contact a of lever 2SG from channel 7, remaining energized only until lever 2SG is restored to normal. Relay 1TKR is released upon the transmission of the track occupied code, rendering relay 2RHS operable to reverse by control codes in which channel 7 is energized. It follows that the energization of the signal control channel 5 or 7 in a transmitted code cannot occur inadvertently, due to a failure of the operator to return the signal lever to normal after the signal it controls has been put to stop by a train.

Each of the slow speed signals in Fig. 2A, that is, each signal except 2RA and 6LA, may be operated as a "call-on" signal to admit a train to an occupied block, but to clear signal 2RC or 6LC for the route governed by signal 2RA or 6LA when such route is occupied, the operation of a call-on button such as 2CO is required. As will be clear from Fig. 1F, when signal lever 2SG is in its right-hand position with relay 1—7TKA released, to enable channel 7 to be energized, a call-on relay 2COR may be energized by pressing button 2CO to connect terminal B at contact b of relay COR to channel 6, whereby relay 2COS, Fig. 3A, is operated to reverse along with relay 2RHS when the signal clearing code is transmitted. Relay 2COR is released by relay 2RHK in response to a code indicating the clearing of the signal, and it follows that channel 6 is not energized in any following control code. Relay COS, however, being of the stay-where-put type, remains reversed until relay 2RHS is restored to normal, whereupon it is restored to normal by the energization of its lower winding over a circuit controlled jointly by relays 2RHS and 2RHSP as shown in Fig. 3A. It follows that a separate operation of the call-on button as well as of the signal lever is required for each train movement.

Referring now to the alternative coding equipment of Figs. 4A and 4B, it will be seen that this is also arranged to prevent the inadvertent clearing of signals as described above. Thus in Fig. 4A, if channel 7 is energized, relay 2RHS is maintained energized by each control code received prior to the release of the detector track relay 1TR. When relay 1TR releases, a circuit is closed momentarily by relay 1TR and a repeating relay 1TP to pick up relay 1TSA, Fig. 4B, along with relays 1OTS and 1ST. Relay 1TSA is held energized over a stick circuit by relay 1ST until the track occupied code is transmitted. Relay 2RHS is released by the opening of contact k of relay 1TR, Fig. 4A, and is held released by the opening of contact b of relay 1TSA only until the track occupied code is transmitted. Likewise, relay 2COS in Fig. 4A is energized over channel 6 and is then held picked up by relay 2RHS until the latter relay is released.

It will be seen that in view of the provisions described above the various controlled devices may be assigned to the different storage units in any desired order or combination, without interfering with their proper operation. Thus a unit may control two independent switches and a group of signals, or two groups of signals, or may control other devices as illustrated by the maintainer's call signal shown.

Operation

The operation of the system of our invention will now be described under different assumed conditions, considering first the form employing the control panel of Fig. 1A, the office circuits of Figs. 1B to 1H, inclusive, and the field circuits of Figs. 3A and 3B for controlling the wayside apparatus of Figs. 2A to 2H, inclusive, and of Fig. 2J.

Starting with this apparatus in its normal condition, as shown, it will be first assumed that the operator reverses the switch lever 3SW and presses button 3STB, to reverse the crossover switches 3AW—3BW, and when the switch indication lamp 3RE becomes lighted indicating that the route from signals 2R to 6R is established, he moves the signal lever 2SG to the right and presses button 1STB, to clear signal 2RC, for a train movement over that route.

The operation of button 3STB energizes the starting relay O3ST, Fig. 1G, thereby initiating the transmission of a control code and also energizing relay 3CK to light the code indicator lamp 3CKE. The opening of back contact d of relay O3ST, Fig. 1H, releases relay 3NWK and so extinguishes lamp 3NE, and by the resulting code, relay O3S, Fig. 1F, is energized to connect terminal B at its contact f over the reverse contact a of the switch lever 3SW and back contact c of relay 3NWK to channel 3. In Fig. 3A, the delivery relay 3D is energized to extend channel 3 over its contact c through the lower winding of relay 3WR to terminal C over contacts e of the switch locking relays 1LR and 3LR provided the proper traffic conditions prevail as manifested by the energization of these locking relays.

It will be seen that relay 3NWK upon releasing opens the route circuit in Fig. 1B, for the existing route from signal 2R to 2L, at its contact d, and that the operation of the interlocked circuits of Figs. 1B and 1H is such as to require the levers and starting buttons to be operated in the sequence recited above. Thus if lever 2SG is reversed before button 3STB is operated, relay 2RGS, Fig. 1B, will be energized over the route circuit extending to terminal B at back contact a of relay 2LGS, causing the green lamp 2RE to flash, indicating that the existing route cannot be changed. If the operator should then press button 3STB, leaving relay 3SW reversed, the energization of relay O3ST would complete a circuit in Fig. 1H from terminal 32 over back contacts e of relays 4RGS, 6LGS and 2LGS, to terminal C at front contact e of relay 2RGS, holding relay 3NWK energized to maintain channel 3 open in the transmitted code, so that relay 3WR would not be operated to reverse.

The operator, however, may move lever 2SG to the right after relay 3NWK releases, but relay 2RGS will remain released until the new route is established and indicated. During this period channel 7 is disconnected from contact a of lever 2SG, Fig. 1F, by the open contact d of relay 2RGS, and relays 2RHS and 2LHS would be retained in their normal position in response to a control code transmitted from this panel. Since relay 1NWK is held energized over the normal contact b of lever 1SW, it would not release if button 1STB were operated. It follows that the operator is free to initiate a control code by operating relay O1ST at this time, to control the maintainer's call signal over channel 4, or for any other purpose independent of the switch and signal levers assigned to the same unit.

Assuming now that relay 3WR has been reversed by the proper manipulation as hereinbefore described, the normal switch repeating relay 3NWP, Fig. 2J, is released by the reversal of contact b of relay 3WR, and the reversal of contacts a and c of relay 3WR causes relays 3A—WZ and 3B—WZ to assume their reverse positions in which the motors of the switch machines are energized over circuits similar to that shown for switch machine 1—SM, in Fig. 2H, to operate the crossover switches 3AW—3BW to reverse.

The operation of the delivery relay 3D by this code also releases the station starting relay 3ST by the opening of its back contact j, as shown for relay 1D in Fig. 3B, thereby initiating the transmission of a return indication code which indicates the transit or open condition of the crossover switches, channels 9 and 11 being deenergized to maintain relays 3NWK and 3RWK released. The operation of relay O3D by this code, however, releases relay 3CK and by extinguishing lamp 3CKE, indicates the response of the wayside apparatus to the switch control code.

When switches 3AW—3BW are operated and locked reverse, relay 3RWP becomes energized as shown in Fig. 2J, and initiates an indication code in which channel 11 is supplied with current over its contact d, Fig. 3B, thereby energizing relay 3RWK, Fig. 1H, over the reverse contact d of lever 3SW, and causing the reverse switch indication lamp 3RE to become lighted, while the closing of contact b of relay 3RWK in Fig. 1B prepares route circuits over which relay 2RGS or 6LGS may be energized. Assuming that lever 2SG is operated to the right, relay 2RGS will become energized over the circuit from terminal B at back contact b of relay 2LGS or at front contact k of relay 5NWK, back contact b of relay 6LGS, contact c of lever 2SG, front contacts b of relays 3RWK and 1NWK, contact b of lever 2SG, and back contacts b of relays 1CK and 2RHK through relay 2RGS to terminal C. The energization of relay 2RGS is made manifest to the operator by the flashing of lamp 2RE, and after noting from observation of the switch indication lamps that the route established is the one desired, he presses the starting button 1STB to initiate a code for clearing the signal controlled by the reversed lever 2SG.

The apparatus of our invention may also be arranged that the code for clearing the signal is transmitted automatically following the last of the indication codes by which the route circuit is established, provided the signal lever is reversed. In this modification the circuits for each of the route check relays, such as relay 2RGS are arranged as illustrated for that relay, in Fig. 9. Referring now to Fig. 9, and assuming that lever 2SG is in its right-hand position, relay O1ST picks up over a route circuit such as the one extending from terminal B over contact d of relay 3NWK and contact b of relay 1NWK for example, thence over the right-hand contact b of lever 2SG, back contact f of relay 1CK, back contact g of relay 2RHK, back contact j of relay 2RGS, the normally closed contact a of button 1STB and the continuity-transfer contact a and winding of relay O1ST to terminal C. Relay 2RGS is energized at the same time over back contacts b of relays 1CK and 2RHK, but is somewhat slower to pick up so that it does not open its contact j until front contact a of relay O1ST closes to establish the usual stick circuit for relay O1ST. Relay O1ST is thus operated automatically to initiate the signal code, with the same effect as if button 1STB had been operated following the energization of relay 2RGS.

In either case, relay O1ST when energized picks up relay 1CK, which extinguishes lamp 2RE and lights lamp 1CKE, and disconnects relay 2RGS from the route circuit and holds it energized over the stick circuit including front contact b of relay 1CK and front contact a of relay 2RGS. The energization of relay O1ST also initiates the transmission of a control code by which relays O1S and 1D are operated. Switch lever 1SW is assumed to be in its normal position and consequently channel 1 is energized in this code and relay 1WR of Fig. 3A, which is assumed to be in its normal position, is energized over contact a of relay 1D, in a direction to hold it in that position. Relay 1WR cannot be operated to reverse in response to the reversal of lever 1SW, for the reason that channel 3 is disconnected from lever 1SW at back contact c of relay 1NWK, Fig. 1F, and as shown in Fig. 1H, relay 1NWP is held energized over a stick circuit having a connection to terminal C at front contact e of relay 2RGS, provided lever 1SW is reversed and relay O1ST is operated after relay 2RGS becomes energized.

Channel 7 is now connected to terminal B at the right-hand contact a of the signal lever 2SG, Fig. 1F, back contact b of relay 1TKA, front contact d of relay 2RGS, and contact g of relay O1S, energizing relay 7P, Fig. 3A, so that the signal control relay 2RHS is energized reverse over contact g of relay 1D. Relay 2RHSP, Fig. 3A, and 2—4HSP, Fig. 2D, become energized over the reverse contacts d and b, respectively, of relay 2RHS, and the approach locking relay 2RAS, Fig. 2E, is released by the opening of the normal contact b of relay 2RHS. Relay 2RAS releases the switch locking relay 1LR, Fig. 2G, and also the section locking relay 1ES, which releases relay 3LR. The switch locking relays LR upon releasing open the circuits for the switch control relays 1WR and 3WR, Fig. 3A, and for the corresponding switch operating relays WZ of Fig. 2H, to lock the switches of the established route. The closing of the back contacts of the relays LR completes a circuit for the signal mechanism 2RCG, Fig. 2B, which extends from terminal B at front contact a of relay 2—4HSP over back contact g of relay 3LR, front contact a of relay 3RWP, back contact g of relay 1LR, front contact a of relay 1NWP, back contacts b of relays 2RAS and 2RTE, contact a of relay 2RHS, front contact b of relay 1NWP, back contact c of relay 3NWP, through mechanism 2RCG over contacts b and c of relay 2RAGP, and over back contact b of relay 1RWP to terminal C at contact c of relay 2RHS. Mechanism 2RCG is thereby energized in the reverse direction to display a slow speed, or yellow indication, releasing relay 2RGP, which by opening its contact *a* in Fig. 1E holds relay 2RAS released until the signal is restored to stop.

The operation of relay 1D by the signal clearing code releases the starting relay 1ST, Fig. 3B, to initiate a return indication code. In general, relay 2RGP will have released before the thirteenth step of this code is reached, in which case channel 13 is not energized, but channel 15 is energized by relay 1MSP over back contact *e* of relay 2RAS and back contact *c* of relay 2RGP, or front contact *c* of relay 2LGP, the operation of relay 01D by this code energizing the signal indication relay 2RHK, Fig. 1H, and releasing relay 1CK. Lamps 1CKE and 2NE are extinguished, and the green signal indication lamp 2RE in Fig. 1C is steadily energized over back contact *e* of relay 2LHK and front contact *e* of relay 2RHK. Relay 2RGS is held energized after the release of relay 1CK, over front contact *b* of relay 2RHK.

In the event the signal fails to clear in time to release relay 2RGP before the thirteenth step of this code is transmitted, channels 13 and 15 will be energized, being connected to terminal B at back contact *e* of relay 2RAS in Fig. 3B over the front contacts *c* of relays 2RGP and 2LGP, respectively, so that the indication code will cause relay 2LHK to become energized along with relay 2RHK, releasing relay 1CK and extinguishing lamps 1CKE, and completing a new circuit for lamp 2NE in Fig. 1C extending over front contacts *c* of relays 2RHK and 2LHK to terminal B at the contact of the interrupter relay CT, thereby indicating the approach-locked condition by the display of a flashing red indication by lamp 2NE. If the delay in the clearing of the signal is but a temporary one, a second code is initiated upon the release of relay 2RGP, by which relay 2LHK is released and relay 2RHK is held energized, whereby lamp 2NE is extinguished, and lamp 2RE is steadily lighted to display the signal clear indication as already described.

It will be seen therefore that the route check relay, such as relay 2RGS, is maintained energized after the starting button is operated to initiate a signal clearing code for reversing the signal control relay 2RHS, until an indication code has been received in which channels 13 and 15 are open, to release relays 2RHK and 2LHK, thereby indicating that the signal control relay occupies its normal position, the signals it controls are at stop, and the approach locking relay 2RAS controlled thereby as well as the associated relay 2LAS are both energized. The release of relays 2RHK and 1CK by this code reconnects relay 2RGS to the route circuit, and it may then be released by restoring the signal lever 2SG to its normal center position. It follows that in order to cancel a route after the issue of a signal clearing code, the release of the route check relay such as relay 2RGS, may be effected by transmitting a signal stop code, with the signal lever in its normal position, to restore relay 2RHS to normal and thereby reenergize relay 2RAS. Under certain conditions, time locking apparatus as illustrated by relay 2RTE in Fig. 2E, will delay the reenergization of relay 2RAS for a suitable interval, but in any case, relay 2RGS will be released by the indication code transmitted when relay 2RAS picks up, if lever 2SG is normal, as is obvious.

In prior systems employing route circuit networks corresponding to that of Fig. 1B, it has been the practice to include normal and reverse contacts of the switch levers in series with the contacts of the normal and reverse switch indication relays so as to check the switch lever positions in these circuits. It is obvious that the switch levers for the switches of an established route, although inactive, may be inadvertently operated, and if their contacts were included in a route circuit the route check relay connected thereto over a reversed signal lever could be picked up or released by the operation of any of these switch levers. In the arrangement shown herein, this is not the case, and when a route relay such as relay 2RGS is energized, it maintains the continuity of the route circuit over which it is picked up and to which it is reconnected upon the release of relays 2RHK and 1CK, and its release therefore is dependent, not only upon the reception of a code indicating that it is proper to cancel the route, but also upon the return of the controlling signal lever to its normal position.

Assuming now that signal 2RC has been cleared for a movement over the route extending to signal 6R, by the series of operations above described, it is to be understood that the operator will also clear signal 6R to extend the route to signal 6L, by moving lever 6SG to the right and pressing button 5STB, but since the resulting operations are similar to those already described, they will not be described in detail.

It will be assumed that the starting relay 01ST is operated after the signal has been cleared, to control the maintainer's call signal over channel 4, for example. Each control code initiated by button 1STB, with channel 7 energized, is effective to maintain relay 2RHS reversed, provided it is received before the train governed by signal 2RC enters section 1T, whereupon relay 2RHS is restored to normal and held normal by relay 1TKR until a track occupied indication is transmitted as already described. If relay 1TKR fails to restore relay 2RHS to normal, due to a fault, relay 2RHS may be operated by code to its normal position, when relay 1TKR is released. Signal 2RC is put to stop by the opening of contacts *a* and *c* of relay 2RHS, in the circuit for its mechanism 2RCG, Fig. 2B, reenergizing relays 2RGP and 2RAS. In the indication code which follows these operations, channel 10 is supplied with current by relay 1TKS, while channels 13 and 15 are open, and as a result of the transmission of this code, relay 1TKR is reenergized over back contact *b* of relay 1TKS if the transmission occurs while section 1T is occupied, or over front contact *g* of relay 1TR if its transmission is delayed until after section 1T is vacated. Relay 1TKR completes a stick circuit at its contact *a* whereby it is held energized independently of relay 1ST. It follows that the signal control relay is placed in condition to be reoperated to reverse by a control code, as soon as an indication of the occupancy of the controlling track section has been transmitted to the office. In response to this indication code, relay 1TK is energized over channel 10 to light the red lamp 1TKE on the track diagram, and a circuit is closed momentarily from channel 10 to wire 21 to pick up relay 1—7TKA, Fig. 1F, as hereinbefore described, and relay 1—7TKA is then held energized over a stick circuit including the right-hand contact *a* of lever 2SG, disconnecting this lever contact from channel 7. Relay 2RHK is released by this indication code, closing a circuit at its back contact d, Fig. 1C, for lighting the red lamp 2NE steadily and also closing a circuit at its back contact c for causing lamp 2RE to flash until relay 2RGS is released by restoring lever 2SG to normal.

Even though this flashing indication is disregarded or fails to be properly displayed, so long as the signal lever 2SG is left in its reverse position, a control code initiated by the operation of relay 0IST after the track occupied indication has been received would find channel 7 held open by relay ITKA.

It will be seen that after a signal has been put to stop by a train, it can be cleared for a second train by restoring its lever to normal, to release the relay TKA, and then reversing it again before initiating the control code for controlling the signal. Since relay 2RHS is operable to reverse with section IT occupied, provided an indication of its occupancy has been transmitted to the office, it may be that a second indication code, indicating that the signal has been recleared for a second train, will find relay ITK already in its energized position, but relay I—7TKA will not become reenergized over channel 10 because back contact b of relay ITK is open. It follows that if the control code for reclearing the signal is repeated, channel 7 remains energized and the code is effective to maintain relay 2RHS reversed.

Assume now that the movement of only one train over the established route is to be considered, and that a conflicting route is to be established as soon as this is vacated. The release of the route check relay 2RGS when the train enters the first section of the route releases the locking circuits at the office so that the operator is free to transmit switch operating codes, although in the field, each switch remains locked with its control relay WR non-responsive until the corresponding track section is vacated and the switch locking relay LR for that section is reenergized. The operator is of course able to avoid the transmission of switch control codes prematurely, making it necessary to repeat them, by observing the lighting of the track occupancy lamps in the track diagram. It may be, however, that a switch will remain locked when the corresponding track section is unoccupied due to a fault in the wayside locking circuits and to enable such faults to be more promptly detected it is of advantage to indicate the condition of the locking relays LR directly, as may be readily accomplished by including in the indication system of Figs. 1H and 3A, the lock indication relays LK controlled over channel 14, as shown in Fig. 6A.

Assuming that these additional indications are included in the first form of the apparatus, the operation of which has just been described, it will be understood that each relay LK controls a red lamp LE, mounted above the corresponding switch lever in Fig. 1A and controlled as in Fig. 7, and that the locking circuits including wires 31—34 in Fig. 1H are modified to include contacts of the lock indication relays therein, as shown in Fig. 6B.

With this modification of the apparatus, the operations involved in clearing signal 2RC for a movement over the route extending to signal 6R are similar to those already described except that relay ILK will be energized by the code which indicates the response of the signal to the control code for clearing it, thereby lighting the switch lever lamp ILE, and the locking relay 3LR upon releasing will initiate a second indication code by which relay 3LK is energized to light lamp 3LE. Front contacts b of relays ILK and 3LK, Fig. 6B, supersede or supplement front contacts e of relays 2RGS in holding relays INWK and 3RWK energized, in Fig. 1H, after these indications are received. Relay ILK is released by the indication code transmitted when section IT is vacated, provided relay ILR becomes energized, and when released permits relay INWK to be released by reversing lever ISW and pressing button ISTB. Relay 3LK remains energized to prevent the release of relay 3RWK until an indication is received that section 3T is vacated and relay 3LR is reenergized. It follows that the relays LK serve to prevent the operator from issuing a control code for the operation of a track switch unless the locking conditions permit the switch to respond and an indication of that fact has been registered at the control office.

It will next be assumed that the apparatus of the first form of our invention has been restored to its normal position as shown and that the operator moves lever 2SG to the right to clear signal 2RA. Relay 2RGS will become energized at once over the route circuit of Fig. 1B which includes contacts b of the switch indication relays INWK, 3NWK, 5NWK and 7NWK, and in Fig. 1H, contacts e and f of relay 2RGS connect terminal C to wires 31—34 to maintain each of these switch indication relays energized, and in response to the operation of button ISTB, a control code is transmitted to reverse relay 2RHS and thereby energize mechanism 2RAG, Fig. 2B, over a branch of a circuit for the corresponding route which includes front contacts b of the track relays ITR, 7TR and 2TR. If any of these sections is occupied, signal 2RA will remain at stop and a stop indication will be returned, lighting lamp 2NE and also causing lamp 2RE to flash. The operator may now clear signal 2RC for this route by operating buttons 2CO and ISTB, with lever 2SG in its right-hand position to reverse relay 2COS, which by closing its contact a, Fig. 2B, completes a circuit for mechanism 2RCG. Lamp 2RE is extinguished by relay ICK when this control code is initiated, and becomes steadily lighted in place of lamp 2NE when the return indication is received.

If now sections IT, 7T and 2T become vacant, mechanism 2RAG becomes energized in multiple with mechanism 2RCG and energizes relay 2RAGP, Fig. 2C, which opens the circuit for mechanism 2RCG, thereby clearing signal 2RA in place of signal 2RC.

The operation of the second form of our invention employing the control panel of Fig. 5A will now be described, assuming first that the lock indication relays of Fig. 6A are not provided.

In this form of the invention all of the lever lamps as well as those on the track diagram are normally dark, and the only lamps lighted at any time are those relating to the routes which have been set up or which are being established. In other words the only lamps lighted are those which are directly of interest to the operator, and the manipulation of the plant is facilitated because the lamp indications are thereby rendered more distinctive than in a conventional panel in which large numbers of similar lights are continuously displayed.

It will first be assumed that the crossover 3AW—3BW is to be reversed and signal 2RC is to be cleared for a movement over the route extending to signal 6R as hereinbefore described. In this form of the apparatus, when lever 3SW is reversed, lamp 3WE becomes lighted at once, over a circuit including the reverse contact e of the switch lever, similar to that shown in Fig. 5D, lamp 3CKE becoming lighted when the control code for reversing the switches is issued, and extinguished upon the reception of the following "switch open" indication. Relay 3NWK is released when the control code is issued and the response of the switch control relay to the code is indicated if lamp 3WE remains lighted, irrespective of the lever position, after lamp 3CKE is extinguished.

If the signal lever 2SG is now operated to the right, lamp 2NE will become lighted and then when the indication code is received by which the reverse switch indication relay 3RWK is energized, relay 2RGS, Fig. 1B, will become energized over the route circuit as hereinbefore described, closing a circuit at its front contact c, Fig. 5B, to light lamps INE and 3RE, by which the course of the route established is indicated on track diagram. The operator now issues the control code for clearing signal 2RC, whereupon relay ICK becomes energized, holding relay 2RGS energized and lighting lamp ICKE. If the signal control relay 2RHS is reversed by this code, relay 2RHK will be energized by the return indication code, and if the signal has cleared, lamp 2NE will be extinguished and lamp 2RE lighted on the track diagram, while if the signal fails to clear, relay 2LHK will also become energized, lamp 2RE will remain dark and lamp 2NE will be caused to flash. In any case, the reception of this code is indicated by lamp ICKE becoming dark, and if the preceding control code failed to reverse relay 2RHS, relay 2RHK will remain released, following the release of relay ICK by the indication code, and lamps 2NE, INE and 3RE will remain lighted. In this case, relay 2RGS may be released, and these lamps extinguished, by restoring lever 2SG to normal.

Assuming now that signal 2RC has been cleared, and is put to stop by a train entering section IT, the resulting indication code will cause lamps ITKE and 2NE to be lighted, and lamp 2RE to be extinguished, lamps 2NE, INE and 3RE becoming extinguished when lever 2SG is restored to normal.

Assuming next that the lock indication relays LK of Fig. 6A are provided with the second form of the apparatus, and arranged to control the switch indication relays and indication lamps as shown in Figs. 6B, 8A and 8B, and also that signal 2RA has been cleared as hereinbefore described so that the signal indication lamp 2RE and the route lamps INE, 3BNE, 5BNE and 7NE on the track diagram have been lighted in response to the energization of relay 2RGS. After the lock indications are received, the route lamps are energized over front contacts c and e of the lock indication relays as shown in Fig. 8A, and are so maintained energized after relay 2RGS is released by the operator to cancel the route, following the lighting of the track occupancy lamp ITKE, lamps INE and 3BNE being extinguished when section IT is vacated, and lamps 5BNE and 7NE when section 7T is vacated.

In the foregoing, only a few typical examples of the operation of the apparatus of our invention have been described in detail, but it is believed that these will be sufficient for an understanding of our invention as applied to the track layout shown herein or to other more complicated track layouts, to which our invention is also applicable.

Although we have herein shown and described only two forms of apparatus embodying our invention and several modifications thereof, it is understood that various changes and modifications may be made therein within the scope of the appended claims without departing from the spirit and scope of our invention.

Having thus described our invention, what we claim is:

1. In combination with a code type communication system connecting an office and a station, a track layout at the station containing electrically interlocked track switches and having railway signals at its opposite ends for governing traffic movements over the routes formed by the track switches, indication relays at the office, controlled by said code system, for indicating the condition of the switches and signals, switch and signal levers for selecting the character of control codes transmitted from the office to control the operation of the switches and signals, manually controllable starting means at the office for initiating the transmission of such control codes and for storing them for transmission one at a time in a predetermined order, means for governing the transmission of the control codes for clearing the signals in accordance with the positions of the track switches comprising a route check relay for each signal lever for each direction of traffic movement governed by such signal lever, a route circuit network comprising contacts of the switch indication relays interconnected to form route circuits which correspond to the routes formed by the track switches, means for energizing each route check relay including a reverse contact of the associated signal lever and a route circuit in said network which is closed when a route governed by a signal which such lever controls is established provided the opposing route check relay for such route is de-energized, means for including an element for clearing said signal in a control code transmitted when said signal lever is reversed, only if such route check relay is energized, a code indicator relay for each starting relay, means for energizing the associated code indicator relay when a control code governed by a signal lever is stored for transmission by the operation of the corresponding starting relay and for maintaining such code indicator relay energized until a return indication code is received which reflects the condition of the signals controlled by said lever, and means controlled by said code indicator relay for disconnecting the energized route check relay from its signal lever and for completing a stick circuit therefor to hold it energized until the code indicator relay is released.

2. In combination with a code type communication system connecting an office and a station, a track layout at the station containing electrically interlocked track switches and having railway signals at its opposite ends for governing traffic movements over the routes formed by the track switches, indication relays at the office, controlled by said code system, for indicating the condition of the switches and signals, switch and signal levers for selecting the character of control codes transmitted from the office to control the operation of the switches and signals, manually controllable starting means at the office for initiating the transmission of such control codes and for storing them for transmission one at a time in a predetermined order, means for governing the transmission of the control codes for clearing the signals in accordance with the positions of the track switches comprising a route check relay for each direction for each signal lever, a route circuit network comprising contacts of the switch indication relays interconnected to form route circuits which correspond to the routes formed by the track switches, means for energizing each route check relay including a reverse contact of the associated signal lever and a route circuit in said network which is closed when a route governed by a signal which such lever controls is established provided the opposing route check relay for such route is deenergized, means for including an element for clearing said signal in a control code transmitted when said signal lever is reversed, only if such route check relay is energized, a code indicator relay for each starting relay, means for energizing each code indicator relay when a control code governed by a signal lever is stored for transmission by the operation of the corresponding starting relay and for maintaining such code indicator relay energized until a return indication code is received which reflects the condition of the signals controlled by said lever, a signal indication relay for each signal lever which is energized by a code which indicates that the signal governed by said signal lever has been cleared and which is released by a code which indicates that the signal is at stop, and means effective as long as either the associated code indicator relay or said signal indication relay is energized for disconnecting the energized route check relay from its signal lever and for completing a stick circuit therefor to hold it energized.

3. In combination with a code type communication system connecting an office and a station, a track layout at the station containing electrically interlocked track switches and having railway signals at its opposite ends for governing traffic movements over the routes formed by the track switches, indication relays at the office, controlled by said code system, for indicating the condition of the switches and signals, starting buttons at the office effective when operated to store control codes for transmission by said code system, switch and signal levers for selecting the character of such codes to thereby control the operation of the switches and signals, means for governing the character of the control codes by which the signals are cleared comprising a route check relay for each direction for each signal lever, a route circuit network comprising contacts of the switch indication relays interconnected to form route circuits which correspond to the routes formed by the track switches, means for energizing each route check relay including a reverse contact of the associated signal lever and a route circuit in said network closed when a route governed by a signal which such lever controls is established provided the opposing route check relay for such route is deenergized, means for visually indicating when a route check relay becomes energized in response to the reversal of its signal lever, means for including signal clearing elements in a control code initiated by the operation of the button for a signal lever which is reversed, only if the corresponding route check relay is energized, a code indicator relay for each starting button, means for energizing such code indicator relay when a signal control code is stored for transmission by the operation of said button and for maintaining such relay energized until a return indication code reflecting the condition of the signals governed by such control code is received, means for visually indicating when said code indicator relay is energized, and means controlled by said code indicator relay for preventing a change in the position of any route check relay which governs the transmission of signal clearing elements in such code, as long as said code indicator relay is energized.

4. In combination with a code type communication system connecting an office and a station, a track layout at the station containing electrically interlocked track switches and having railway signals at its opposite ends for governing traffic movements over the routes formed by the track switches, indication relays at the office controlled by said code system for indicating the condition of the switches and signals, switch levers for determining the character of certain elements and signal levers for determining the character of other elements of control codes transmitted by said code system, a route check relay for each direction for each signal lever, a route circuit network comprising contacts of the switch indication relays interconnected to form route circuits which correspond to the routes formed by the track switches, means for energizing each route check relay including a reverse contact of the associated signal lever and a route circuit in said network which is closed when a route governed by the signal which such signal lever controlls is established, provided the opposing route check relay for such route is deenergized, means for including a signal clearing element in a code in response to the reversal of a signal lever only if the corresponding route check relay is energized, and means controlled by said route check relay when energized for so controlling the character of the switch control elements in such code as to render them incapable of operating the corresponding track switch.

5. In combination with a railway signal for governing traffic movements over routes including one or more track switches, a code system for transmitting control codes for governing the operation of the track switches and of said signal in accordance with the positions of switch and signal levers at a control office, and for also transmitting indication codes to control switch and signal indication relays at the office in accordance with the condition of said switches and signal, starting buttons at the office effective when operated to store control codes for transmission by said code system, for the control of said switches, and of said signal, a code indicator relay, means for energizing said code indicator relay when a code for controlling said signal is stored for transmission by the operation of the associated starting button and for maintaining said code indicator relay energized until an indication code is received which reflects the condition of said signal, a route check relay, a pick-up circuit for said route check relay including a back contact of said code indicator relay, a reverse contact of said signal lever, and contacts of said switch indication relays closed when a route governed by said signal is established, a stick circuit for said route check relay including its own front contact and a front contact of said code indicator relay, and means rendering a code transmitted when said signal lever is reversed effective to clear said signal only if said route check relay is energized.

6. In combination with a railway signal for governing traffic movements over routes including one or more track switches, a code system for transmitting control codes for governing the operation of the track switches and for operating a control relay for said signal in accordance with the positions of switch and signal levers at a control office and for also transmitting indication codes to control switch indication relays at the office which reflect the positions of the track switches and to control a signal indication relay which when released indicates that the signal is at stop and that its control relay is in a corresponding normal position, starting buttons at the office effective when operated to store control codes for transmission by said code system for the control of said switches and of said signal, a code indicator relay, means for energizing said code indicator relay when a code for controlling said signal is stored for transmission by the operation of the associated starting button and for maintaining such code indicator relay energized until an indication code is received which reflects the condition of said signal, a route check relay, a pick-up circuit for said route check relay including back contacts of said code indicator relay and of said signal indication relay, a reverse contact of said signal lever, and contacts of said switch indication relays closed when a route governed by said signal is established, two stick circuits for said route check relay including its own front contact and front contacts of said code indicator relay and of said signal indication relay, respectively, and means controlled by said route relay when energized for rendering the code transmitted when said signal lever is reversed effective to operate said signal control relay to a position for clearing said signal.

7. In combination with a railway signal for governing traffic movements over routes including one or more track switches, a code system for transmitting control codes to operate switch and signal control relays in accordance with the positions of switch and signal levers at a control office, for governing the operation of said switches and said signal and for also transmitting indication codes to control switch and signal indication relays at the office which reflect the condition of said switches and said signal and of their control relays, starting buttons at the office effective when operated to store control codes for transmission by said code system for the control of said switches and of said signal, a route check relay, means for energizing said route check relay in response to the reversal of said signal lever provided the switch and signal indication relays occupy positions indicating that a route governed by the signal which such lever controls is established and that the control relay for such signal is in its normal position, means for locking said route check relay energized from the time a code for controlling said signal is stored for transmission by the operation of the associated starting button until a code is received which indicates that the signal is at stop with its control relay in its normal position, and means controlled by said route check relay for rendering the control codes transmitted when such relay is released ineffective to operate said signal control relay to reverse to correspond with the reverse position of said signal lever and for rendering the control codes transmitted when said route check relay is energized ineffective to operate said switch control relays in response to changes in the positions of their respective switch levers.

8. In combination with a railway signal for governing traffic movements over routes including a track switch, a code system for transmitting control codes for governing the operation of said track switch and signal in accordance with the positions of switch and signal levers at a control office and for also transmitting indication codes for energizing a normal or a reverse switch indication relay to indicate the position of the track switch, manually controllable starting means for initiating the transmission of said control codes, a local stick circuit for each switch indication relay for maintaining it energized after such relay has been picked up by an indication code, which includes a contact closed by the switch lever in the corresponding normal or reverse position, means for opening said stick circuit when the starting means is operated provided the switch lever has been moved to open said lever contact, and means controlled by said signal lever for preventing the opening of said stick circuit by said starting means if said signal lever has been reversed to render such control code effective to clear said signal.

9. In combination with a railway signal for governing traffic movements over one or more routes including a track switch, normal and reverse indication relays for indicating the position of the switch, a code system for transmitting control codes for governing the operation of the track switch and signal in accordance with the positions of switch and signal levers at a control office, and for also transmitting indication codes for energizing said normal indication relay or said reverse indication relay to indicate the position of the switch, a starting relay for initiating the transmission of said control codes, a route check relay for governing the transmission of codes for clearing the signal, means for energizing said route check relay when the signal lever is reversed comprising a route circuit closed only when a route governed by said signal is available which includes a front contact of the normal or reverse indication relay for said switch, and stick circuits for said indication relays controlled by said switch lever and said starting relay, and also by said route check relay, so arranged that the energized normal or reverse indication relay is released in response to the operation of said starting relay, provided the position of the switch lever does not correspond with the indicated position of the switch and said route check relay is not energized.

10. In combination with a railway track switch, normal and reverse indication relays for indicating the position of the switch, a code system for transmitting control codes for governing the operation of the track switch to normal or reverse in accordance with the position of a switch lever at a control office and for transmitting indication codes for energizing said normal indication relay or said reverse indication relay to indicate the position of the switch, a starting relay for initiating the transmission of said control codes, a stick circuit for each indication relay closed over a contact of said switch lever in the corresponding normal or reverse position when said relay is picked up by the operation of said code system, means for opening said stick circuit when said starting relay is operated but only if said lever has been moved to a position out of correspondence with the switch position indicated by the energized normal or reverse switch indication relay, and circuits rendering the code initiated by said starting relay effective to govern the operation of the switch from said indicated position to its opposite position in response to a change in the position of said signal lever only if the normal or reverse indication relay corresponding to said indicated position is released upon the initiation of such code.

11. In combination with a railway track switch, a normal and a reverse indication relay for indicating the position of the switch, a code type communication system for transmitting control codes including elements for operating the track switch to normal or reverse selected in accordance with the position of a switch lever, manually controllable starting means for initiating the transmission of said control codes and for storing them for transmission one at a time in order, means controlled by the track switch for momentarily energizing said normal or reverse indication relay when the switch occupies a corresponding normal or reverse position, a stick circuit for said normal or reverse indication relay including its own front contact and a contact closed by the switch lever in a corresponding normal or reverse position, bridged by a contact which opens when a control code is stored for transmission, a system of route circuits including front contacts of said indication relays for indicating different available routes over the track switch, and means for including elements in a control code for operating the track switch to either its normal or reverse position to correspond with the position of said lever only if the indication relay which indicates its other position is released.

12. In combination with a code type communication system connecting an office and a station, a track layout at the station containing electrically interlocked track switches and having railway signals at its opposite ends for governing traffic movements over the routes formed by the track switches, a normal and a reverse indication relay at the office for each single track switch or crossover in said layout, starting relays at the office for initiating the transmission of control codes by said communication system for operating control relays at the station and thereby govern the track switches and signals in accordance with the positions of their respective switch and signal levers at the office, means for initiating the transmission of indication codes by said communication system to energize said indication relays in accordance with the positions of the track switches, a route check relay for each direction for each signal lever, route circuits for energizing said route check relay including interconnected contacts of said indication relays and closed only when a route governed by the signal which such lever controls is energized, a stick circuit for each switch indication relay closed over a contact of the associated switch lever in a corresponding normal or reverse position when such relay is picked up, means for opening said stick circuit when the associated starting relay is operated to initiate a code, but only if said switch lever has been moved to its opposite position and no route check relay which such indication relay controls is energized, means rendering such code ineffective to operate the track switch to its opposite position unless such indication relay releases and thereby opens the route circuit for each route over the switch, and means for preventing the transmission of a code including elements for clearing a signal for a route over said switch unless the corresponding route check relay is energized.

13. In combination with a railway track switch and a signal for governing traffic movements over the switch, a normal and a reverse indication relay for indicating the position of the switch, a code type communication system for transmitting codes of impulses from a control office to operate the track switch to normal and reverse and to control the signal in accordance with the positions of switch and signal levers at said office, a manually controllable starting relay for initiating the transmission of said codes, means controlled by the track switch for momentarily energizing said normal or reverse indication relay to indicate that the switch occupies a corresponding normal or reverse position, a stick circuit for holding said normal or reverse indication relay energized including a contact closed by the switch lever in the corresponding normal or reverse position, circuit means rendering a signal control code transmitted when said signal lever is reversed ineffective to clear the signal unless transmitted when said normal or reverse indication relay is picked up, means for opening the stick circuit for the energized indication relay when said starting relay is operated to initiate the transmission of a switch control code but only if said switch lever has been moved to its opposite position, and circuit means dependent upon the release of such indication relay for rendering said control code effective to operate the track switch to its opposite position.

14. In a centralized traffic control system for the control of the switches and signals of a railway track layout from a control office, means for transmitting control codes for governing said switches and signals in accordance with the positions of switch and signal levers at the office and for transmitting indication codes to said office to energize indication relays to indicate the positions of the switches and the condition of the signals, a system of route check relays controlled by the signal levers, a route circuit network of circuits conforming to the track layout over which each route check relay may be energized in response to the reversal of its signal lever only if certain of the switch indication relays have been energized to indicate that a route governed by the signal which such lever controls is available, means for releasing each energized switch indication relay to interrupt the route circuits for routes over the corresponding switch when a control code for changing the position of that switch is transmitted, but only if no route relay has been energized over a circuit for a route which includes that switch, means rendering a code for controlling a switch ineffective to change the position of that switch if such code is transmitted when an indication relay for the switch is energized, means rendering each code for controlling a signal ineffective to operate the control relay therefor in response to the reversal of the corresponding signal lever unless the associated route check relay has been energized over a circuit for a route governed by such signal, and means for holding each energized route check relay in its energized position from the time a control code governed by such relay is transmitted until an indication code is received which indicates that the signal controlled by such code is at stop and that its control relay has been restored to its normal position.

15. In a centralized traffic control system for the control of the switches and signals of a railway track layout from a control office, means for transmitting control codes for governing said switches and signals in accordance with the positions of switch and signal levers at the office and for transmitting indication codes to said office to energize indication relays to indicate the positions of the switches and the condition of the signals, a system of route check relays controlled by the signal levers, a route circuit network of circuits conforming to the track layout over which each route check relay may be energized in response to the reversal of its signal lever only if certain of the switch indication relays have been energized to indicate that a route governed by the signal which such lever controls is available, means for governing the character of the switch and signal control elements in said control codes by said route check relays, so arranged that each code assigned to the control of a track switch is effective to govern the operation of that track switch to a position corresponding to that of its switch lever only if no route check relay has been energized over a circuit for a route which includes that switch, and each code assigned to the control of a signal is effective to clear such signal in response to the reversal of its signal lever only when the route check relay controlled by that signal lever is energized.

16. In a centralized traffic control system for the control of the switches and signals of a railway track layout from a control office, means for transmitting control codes for governing said switches and signals in accordance with the positions of switch and signal levers at the office and for transmitting indication codes to said office to energize indication relays to indicate the positions of the switches and the condition of the signals, a system of route check relays controlled by the signal levers, a route circuit network of circuits conforming to the track layout over which each route check relay may be energized in response to the reversal of its signal lever only if certain of the switch indication relays have been energized to indicate that a route governed by the signal which such lever controls is available, starting relays for initiating the transmission of said control codes, manually operable means for actuating said starting relays to initiate the transmission of codes for operating the track switches, and means controlled by each signal lever when reversed for connecting the associated starting relay to that route circuit over which the associated route check relay is energized, whereby said starting relay is automatically operated when a route governed by the signal which such lever controls becomes established.

17. In combination with a railway signal for governing traffic movements over a detector track section having a track relay, a control relay for the signal, an intermittently available communication system for transmitting codes from a control office for operating the control relay to clear the signal or to restore said relay to its normal position to condition the signal to indicate stop, a storage relay controlled by the track relay for causing said communication system to transmit indications of the condition of said detector track section to the office, means governed by said communication system for controlling said storage relay to store each track occupied indication until transmitted in the event said communication system is unavailable when a train enters said track section, and means controlled by said communication system for preventing the response of the control relay to any code for clearing the signal which is received after a train enters said track section, until an indication of the occupancy of said track section as reflected by said storage relay has been transmitted by said communication system.

18. In combination with a railway signal for governing traffic movements over a detector track section having a track relay, a control relay for the signal, an intermittently available communication system for transmitting codes from a control office for operating the control relay to clear the signal or to restore said relay to its normal position to condition the signal to indicate stop, a storage relay controlled by the track relay for causing said communication system to transmit indications of the condition of said detector track section to the office, means governed by said communication system for controlling said storage relay to store each track occupied indication until transmitted in the event said communication system is unavailable when a train enters said track section, means controlled by the track relay for restoring the control relay to its normal position when a train enters said track section, and means controlled by the communication system for preventing the response of said control relay to any code for clearing the signal which is received after a train enters said track section but before an indication of the occupancy of said track section has been transmitted by said communication system.

19. In combination with a railway signal for governing traffic movements over a detector track section having a track relay, a control relay for the signal, an intermittently available communication system for transmitting codes from a control office for operating the control relay to clear the signal or to restore said relay to its normal position to condition the signal to indicate stop, a storage relay controlled by the track relay for causing said communication system to transmit indications of the condition of said detector track section to the office, means governed by said communication system for controlling said storage relay to store each track occupied indication until transmitted in the event said communication system is unavailable when a train enters said track section, means controlled by the track relay and effective momentarily when a train enters said track section to restore the control relay to its normal position, and means controlled by the storage relay for maintaining said control relay in its normal position, even though a code for operating said relay is received, until an indication of the occupancy of said track section has been transmitted to the office by said communication system.

20. In combination with a railway signal for governing traffic movements over a detector track section having a track relay, a control relay for the signal, an intermittently available communication system for transmitting codes from a control office for operating the control relay to clear the signal or to restore said relay to its normal position to condition the signal to indicate stop, a storage relay controlled by the track relay for causing said communication system to transmit indications of the condition of said detector track section to the office, means governed by said communication system for controlling said storage relay to store each track occupied indication until transmitted in the event said communication system is unavailable when a train enters said track section, means for restoring said control relay to its normal position and for rendering it nonresponsive to codes for clearing said signal, rendered effective by the release of the track relay when a train enters said track section, and means controlled by said communication system and requiring the transmission of an indication of the occupancy of said track section to render the control relay again responsive to codes for clearing said signal.

21. In combination with a railway signal for governing traffic movements over a detector track section having a track relay, a control relay for the signal, an intermittently available communication system for transmitting codes from a control office for operating said control relay to clear the signal or for restoring said relay to its normal position to cause the signal to indicate stop, said system being also adapted to transmit indication codes to the office to indicate the condition of occupancy of said track section, a repeating relay and a storage relay controlled by the track relay, means for actuating said repeating relay and said storage relay when the track relay releases, means responsive to each change in the position of said storage relay for causing the transmission of an indication code by said communication system reflecting the position of said storage relay, means controlled by said communication system for restoring the repeating relay to its normal position when said code is transmitted, irrespective of the position of the track relay, means controlled by said communication system for restoring the storage relay to normal position only when such code has been transmitted and the track relay is reenergized, and means controlled by said repeating relay when actuated for holding said control relay to its normal position.

22. In combination with a railway signal for governing traffic movements over a detector track section having a track relay, a control relay for the signal having pick-up and stick circuits, an intermittently available communication system for transmitting codes from a control office to pick up said control relay to clear the signal or for releasing said relay to cause the signal to indicate stop, said system being also adapted to transmit indication codes to the office to indicate the condition of occupancy of said track section, a repeating relay and a storage relay controlled by the track relay, means for actuating said repeating relay and said storage relay when the track relay releases, means responsive to each change in the position of said storage relay for causing the transmission of an indication code by said communication system reflecting the position of said storage relay, means controlled by said communication system for restoring the repeating relay and the storage relay to their normal positions when said code is transmitted, so arranged that the storage relay is restored only when the track relay is energized, and means controlled by the track relay and by said repeating relay for releasing said control relay when the track relay releases, and for maintaining said control relay released only until said repeating relay is restored to its normal position.

23. In combination with a railway signal for governing traffic movements over a detector track section having a track relay, a control relay for the signal, a signal lever at a control office, a communication system for transmitting control codes from the office for operating said control relay to clear the signal when said lever is reversed or to restore said relay to its normal position when said lever is in its normal position, said system being also adapted to transmit indication codes to the office, to indicate the condition of occupancy of said detector track section, a stick relay associated with said lever, a pick-up circuit for said stick relay closed momentarily when a track occupied indication is received, a stick circuit for said stick relay closed when said stick relay picks up only if said lever is reversed, and means controlled by said stick relay for preventing the transmission of a code for operating said control relay as long as said stick relay is energized.

24. In combination with a railway signal for governing traffic movements over a detector track section having a track relay, a control relay for the signal, a signal lever at a control office, a communication system for transmitting control codes from the office for operating said control relay to clear the signal when said lever is reversed or to restore said relay to its normal position when said lever is in its normal position, said system being also adapted to transmit indication codes to the office, to indicate the condition of occupancy of said detector track section, a stick relay associated with said lever, which if operated renders the control codes transmitted when the control lever is reversed ineffective to operate said control relay, means controlled by said communication system for operating said stick relay when an indication code is received indicating that said track section has become occupied, and means controlled by said lever for restoring said stick relay to its normal position in response to the movement of said lever to its normal position.

25. In combination with a railway signal for governing traffic movements over a detector track section having a track relay, a control relay for the signal, a signal lever at a control office, a communication system for transmitting control codes from the office for operating said control relay to clear the signal when said lever is reversed or to restore said relay to its normal position when said lever is in its normal position, said system being also adapted to transmit indication codes to the office, an indication relay controlled by said indication codes to indicate the occupancy of said track section, a stick relay associated with said lever, which if operated renders the codes transmitted when said lever is reversed ineffective to operate said control relay, means for operating said stick relay when an indication code which indicates the occupancy of said track section is received, provided said lever is reversed and the unoccupied condition of said track section is indicated by said indication relay prior to the reception of such code, and means controlled by said lever for maintaining said stick relay in its operated position only as long as said lever remains in its reverse position.

26. In combination with a railway signal for governing traffic movements over a detector track section having a track relay, a control relay for the signal, a signal lever at a control office, a communication system for transmitting control codes from the office for operating said control relay to clear the signal when said lever is reversed or to restore said relay to its normal position when said lever is in its normal position, said system being also adapted to transmit indication codes to the office, to indicate the condition of occupancy of said track section, a stick relay associated with said lever, a storage relay controlled by the track relay for causing said communication system to transmit indications of the condition of said track section to the office and for storing each track occupied indication until transmitted, means controlled by said communication system for preventing the response of the control relay to any code for clearing the signal which is received after a train enters said track section until an indication of its occupancy has been transmitted by said storage relay, means controlled by such code for operating said stick relay, means controlled by said stick relay when operated for rendering any control code transmitted with said lever in its reverse position ineffective to operate said control relay, and means for returning said stick relay to its normal position when said lever is operated at least momentarily to its normal position.

27. In combination with a code type communication system connecting an office and a station, a railway track layout at the station including track switches operable to normal and reverse positions to form different routes and having signals for governing traffic movements over the routes, a miniature track diagram of said layout at a control office having switch and signal levers associated therewith for governing the transmission of codes by said system for controlling said switches and signals, a normal and a reverse switch indication relay for each switch responsive to codes transmitted by said system for indicating the positions of said switches, a route check relay for each signal lever, a circuit for each route check relay closed when the associated signal lever is reversed provided a route is established for a signal which such lever controls, said circuit including a front contact of the normal or reverse indication relay for each switch in such route, a normal and a reverse indication lamp for each switch, one in each of the tracks of said diagram adjacent to and on the trailing side of the representation of the corresponding switch, a route circuit for each route arranged to be supplied with energy over a front contact of the route check relay for the entrance end of such route, each such circuit including a front contact of that normal or reverse indication relay for each switch which is energized when such route is established, and means for energizing the normal or reverse indication lamp for each switch of a route to light a series of lamps representing such route comprising connections to the route circuits over front contacts of the corresponding normal or reverse indication relays.

28. In combination with a code type communication system connecting an office and a station, a track switch at the station, a normal and a reverse indication relay at the office controlled by said communication system and reflecting the position of the track switch, signals for governing traffic movements over the two routes formed by the switch in its normal and reverse position, respectively, signal levers at the office, route check relays for the opposite ends of the routes controlled by said levers for controlling said communication system to govern the clearing of the signals thereby, each route check relay having a circuit closed when a route over the switch is established which includes a reverse contact of the associated signal lever and a front contact of the normal or reverse indication relay for the switch and also a back contact of the route check relay for the opposite end of the same route, a normal and a reverse indication lamp for the switch, and circuits for energizing either said normal or said reverse indication lamp when any one of said route check relays is energized, each such circuit including a front contact of the corresponding normal or reverse indication relay and a front contact of the route check relay for either end of the route established when such indication relay is energized.

29. In combination with a code type communication system connecting an office and a station, a track switch at the station, a normal and a reverse indication relay at the office controlled by said communication system and reflecting the position of the track switch, signals for governing traffic movements over the two routes formed by the switch in its normal and reverse position, respectively, signal levers at the office, route check relays for the opposite ends of the routes controlled by said levers for controlling said communication system to govern the clearing of the signals thereby, each route check relay having a circuit closed when a route over the switch is established which includes a reverse contact of the associated signal lever and a front contact of the normal or reverse indication relay for the switch and also a back contact of the route check relay for the opposite end of the same route, a normal and a reverse indication lamp for the switch, circuits for energizing either the normal or reverse indication lamp when any one of said route relays is energized, each such circuit including a front contact of the corresponding normal or reverse indication relay and a front contact of the route check relay for either end of the route established when such indication relay is energized, means for transmitting a code for clearing each signal effective only when the corresponding route check relay is energized, and means controlled by said communication system for maintaining such route check relay energized when such code has been transmitted until a code indicating that the signal has been returned to its normal stop position is received at said office.

30. In combination with a code type communication system connecting an office and a station, a track layout at said station including a plurality of track switches which may be arranged to form different routes, a miniature track diagram of said layout at said office having a normal and a reverse indication lamp for each switch located in the tracks adjacent to and on the trailing side of the representation of the switch, switch indication relays controlled by said communication system in accordance with the positions of their respective track switches, means controlled by said indication relays for preparing circuits for the normal or reverse indication lamp for each switch, and means including a route check relay controlled over contacts of said indication relays for completing the circuits for a selected series of said lamps to indicate on the track diagram the course of a route when established.

31. In a centralized traffic control system for railroads, a track layout including interlocked track switches and signals for governing traffic movements over the different routes in said layout, a miniature track diagram of said layout at a control office, switch levers for controlling said switches, signal levers controlling route check relays for clearing said signals, switch indication relays which reflect the positions of said switches, signal indication relays which reflect the condition of said signals, a circuit for each route check relay closed when the associated signal lever is reversed but only if said switch indication relays indicate that a route is set up for a traffic movement controlled by the signal which such route check relays governs, a signal lamp at each signal location in said track diagram, two switch indication lamps for each switch adjacent to and on the trailing side of the representation of the switch on said track diagram, a circuit for each switch indication lamp prepared by said switch indication relays to indicate the position of the switch in a route and completed upon the energization of the route check relay for the signal at the entrance end of such route, and a circuit for the signal lamp for said signal prepared by said route check relay and completed by the corresponding signal indication relay when said signal clears.

32. In a centralized traffic control system for railroads, a track layout including track switches and signals for governing traffic movements over the different routes in said layout, a miniature track diagram of said layout at a control office, switch levers for controlling said switches, signal levers controlling route check relays for clearing said signals, switch indication relays which reflect the positions of said switches, a circuit for each route check relay closed when the associated signal lever is reversed but only if said switch indication relays indicate that a route is set up for a traffic movement controlled by the signal which such route check relay governs, a normal and a reverse switch indication lamp for each switch adjacent to and on the trailing side of the representation of the switch on said track diagram, a circuit for each normal or reverse switch indication lamp closed only when the route check relay for a signal at either end of a route which includes the switch is energized and said switch indication relays indicate that such route is established, and means including a starting button associated with each signal lever for rendering the route check relay associated with said lever effective to clear its signal, whereby the clearing of any signal may be delayed until the course of the route which such signal governs has been indicated on the track diagram by the lighting of the normal or reverse indication lamp for each switch of such route.

33. In combination with a code type communication system connecting an office and a station, a track layout including track switches and signals for governing traffic movements over the different routes in said layout, switch levers for controlling said switches, a normal and a reverse indication relay for each switch each arranged to be energized only when such switch occupies a corresponding normal or reverse position, a route check relay for governing the clearing of a signal for a route over said track switches, an energizing circuit for said route relay controlled over front contacts of that normal or reverse indication relay for each switch of the route which is energized when such route is established, a normal and a reverse indication lamp for each switch of such route each having a circuit including a front contact of the corresponding normal or reverse indication relay, the circuits for those lamps which indicate the course of such route also including a front contact of said route check relay, and a disagreement lamp associated with each switch lever having one circuit including a reverse contact of said lever and a back contact of the associated normal indication relay, and another circuit including a normal contact of said lever and a back contact of the associated reverse indication relay.

34. In combination with a code type communication system for governing the operation of a railway track switch and for indicating its condition, a normal and a reverse indication relay controlled by said communication system for indicating the position of the switch, a switch lever operable between normal and reverse positions, means for causing said communication system to transmit a code for operating said switch to normal or reverse including circuits closed by said lever in its normal position over a back contact of said reverse indication relay and by said lever in its reverse position over a back contact of said normal indication relay, means responsive to the initiation of such code for releasing said normal indication relay if said lever is in its reverse position and for releasing said reverse indication relay if said lever is in its normal position, an indication lamp associated with said lever, and two circuits for energizing said lamp one including a back contact of the reverse indication relay and a contact which is opened by the lever only in its normal position and the other including a back contact of the normal indication relay and a contact which is opened by the lever only in its reverse position.

35. In combination with a railway track switch, a code type communication system for transmitting control codes for operating the track switch in accordance with the position of a switch lever at a control office and for transmitting indication codes to energize a normal or a reverse switch indication relay to indicate the position of the track switch, a switch locking relay controlled by traffic conditions adjacent the switch and adapted when released to prevent the operation of the track switch, a lock indication relay at the office controlled by said communication system to indicate the condition of said locking relay, manually controllable starting means for initiating the transmission of said control codes, a local stick circuit for each switch indication relay for maintaining it energized after such relay has been picked up by an indication code, said circuit having one branch closed by the switch lever in the corresponding normal or reverse position, and another branch by which the circuit may be opened when the starting means is operated to initiate the transmission of a control code, provided the switch lever has been moved to open said lever contact and also provided said lock indication relay indicates that the switch is free to respond to such code, and means dependent upon the release of the normal or reverse switch indication relay for including an element for operating the switch to its reverse or normal position, respectively, in such control code.

36. In combination with a railway signal for governing traffic movements over a detector track section including a track switch, a code type communication system for transmitting control codes for governing the operation of the track switch and signal in accordance with the position of switch and signal levers at a control office and for transmitting indication codes controlling a normal or reverse switch indication relay to indicate the position of the track switch and also controlling a lock indication relay which indicates whether the switch is locked or is free to be operated, manually operable starting means for initiating the transmission of said control codes, a local stick circuit for each switch indication relay for maintaining it energized after such relay has been picked up by an indication code, said circuit having one branch closed by the switch lever in the corresponding normal or reverse position and another branch by which the circuit may be opened if the starting means is operated when said lever contact is open, provided the signal has not been cleared, means controlled by said lock indication relay for preventing the opening of said stick circuit by said starting means when the signal has been cleared and also after the signal has been restored to stop by a train entering said detector section until such section is vacated, and means dependent upon the release of the normal or reverse switch indication relay for including an element for operating the switch to its reverse or normal position, respectively, in such control code.

37. In combination with a railway signal for governing traffic movements over a detector track section including a track switch, a code type communication system for transmitting control codes for governing the operation of the track switch and signal in accordance with the position of switch and signal levers at a control office and for transmitting indication codes controlling a normal or reverse switch indication relay to indicate the position of the track switch and also controlling a lock indication relay which indicates whether the switch is locked or is free to be operated, a route check relay for governing the transmission of control codes for clearing the signal, a circuit for energizing said route check relay including a reverse contact of said signal lever and a front contact of said normal or of said reverse switch indication relay, manually operable starting means for initiating the transmission of said control codes, a local stick circuit for each switch indication relay for maintaining it energized after such relay has been picked up by an indication code, said circuit having one branch closed by the switch lever in the corresponding normal or reverse position and a second branch by which the circuit may be opened if the starting means is operated when said lever contact is open, provided said route check relay has not been energized and said lock indication relay indicates that the track switch is free to be operated, and circuits including back contacts of said switch indication relays in series with contacts of said switch lever for rendering the control code effective to govern the operation of the track switch.

38. In combination with a railway track switch, normal and reverse indication relays for indicating the position of the switch, a lock indication relay controlled by traffic conditions adjacent the switch for indicating whether the switch is locked or is free to be operated, a code system for transmitting control codes for governing the operation of the track switch to normal or reverse in accordance with the position of a switch lever at a control office and for transmitting indication codes to pick up said normal or said reverse switch indication relay to indicate the position of the switch and for also controlling said lock indication relay, a starting relay for initiating the transmission of said control codes, and means for holding each energized switch indication relay picked up only until a control code for operating the track switch to its opposite position is initiated by the operation of said starting relay when said lock indication relay indicates that the switch is free to respond to such code, and means requiring the release of said energized indication relay to render such code effective to operate the track switch.

39. In combination with a railway track layout containing electrically interlocked track switches and having railway signals at its opposite ends for governing traffic movements over the routes formed by the track switches, a code system for transmitting control codes for governing the operation of the track switches and signals in accordance with the positions of switch and signal levers at a control office, and for transmitting indication codes to energize a normal or a reverse indication relay for each track switch when the switch assumes a corresponding normal or reverse position and for also controlling a lock indication relay for each switch which indicates whether the switch is locked or is free to be operated, a route check relay at the office for each direction for each signal lever, a route circuit network comprising contacts of the switch indication relays interconnected to form route circuits over which said route check relays may be energized, each in response to the operation of its signal lever to a position for clearing its signal only if a switch indication relay for each switch in the route which such signal governs is energized, and the route check relay for the opposing signal for such route is released, means for releasing the energized indication relay for a switch when a control code is transmitted following a change in the position of the corresponding switch lever to prevent the energization of the route check relay for any route over that switch until it assumes a position corresponding to that of its switch lever, means rendering a control code transmitted following the operation of a signal lever effective to clear the signal which such lever controls only if the corresponding route check relay is energized, and means controlled by the lock indication relay for each switch for preventing the release of the energized indication relay for the associated switch to prevent the interruption of the route circuit for any route over that switch except when the switch is free to be operated.

40. In combination with a code type communication system connecting an office and a station, a track layout at said station including a plurality of track switches which may be arranged to form different routes, a miniature track diagram of said layout at said office having a normal and a reverse indication lamp for each switch located in the tracks adjacent to and on the trailing side of the representation of the switch, switch indication relays controlled by said communication system in accordance with the positions of their respective track switches, a lock indication relay for each switch controlled by said communication system which indicates whether the switch is locked or is free to be operated, means controlled by said indication relays for preparing circuits for the normal or reverse indication lamp for each switch, means including a route check relay controlled over contacts of said indication relays for completing the circuits for a selected series of said lamps to indicate on the track diagram the course of a route when established, and means controlled by the lock indication relay for each switch for superseding said route check relay in the control of the energized indication lamp for the corresponding track switch to maintain such lamp energized after a route is cancelled until such switch is free to be operated.

41. In combination with a railway signal for governing traffic movements over routes including one or more track switches, switch levers for said track switches and manually governed signal control means at a control office, a code communication system for transmitting control codes from said office to operate said track switches to normal or reverse in accordance with the positions of their respective switch levers and for operating a signal control relay to a signal clearing or a stop position in accordance with the position of said signal control means and for also transmitting indication codes to said office to actuate switch indication relays which reflect the positions of the track switches and to control a signal indication relay which in a first position indicates that said signal is at stop and that its control relay is in a position to maintain said signal at stop, means for operating said signal control means to a position for clearing said signal effective only when the switch indication relays indicate that a route governed by the signal is complete, a code indicator relay, means for actuating said code indicator relay when a code for controlling said signal is initiated and for restoring said code indicator relay to its normal position when an indication code is received which reflects the condition of said signal, and means for restoring said signal control means to its normal position effective only when said code indicator relay is in its normal position and said signal indication relay is in said first position.

42. In combination with a railway signal for governing traffic movements over routes including one or more track switches, a switch lever for each switch and a route check relay for controlling said signal, at a control office, a code communication system for transmitting control codes from said office to operate switch and signal control relays for governing the operation of said switches and signal, in accordance with the positions of said switch levers and of said route check relay, and for also transmitting indication codes to said office to control indication relays which reflect the condition of said switches and signal and of their control relays, circuit means controlled by said route check relay for rendering the control codes transmitted when such relay is in a normal position ineffective to operate the signal control relay to a signal clearing position and for rendering the control codes transmitted when such relay is in its actuated position ineffective to operate the switch control relay for any switch in a route governed by said signal which is established at the time said route check relay assumes its actuated position but without interfering with the transmission of control codes for operating track switches not included in such route, and means effective when said route check relay is actuated for maintaining it actuated from the time at which a control code for clearing the signal is initiated until an indication code is received which indicates that the signal is at stop with its signal control relay in a position to maintain the signal at stop.

43. In combination with a railway signal for governing traffic movements over routes including a track switch, a signal lever for said signal and a switch lever for said switch, located at a control office, a code system for transmitting control codes for governing the operation of said track switch and signal in accordance with the positions of the switch and signal levers at said office and for also transmitting indication codes for indicating the position of said track switch, a normal and a reverse switch indication relay at said office, means responsive to an indication code transmitted only when the switch is in its normal or reverse position respectively for operating said normal or reverse switch indication relay from a first to a second position, manually operable means for initiating the transmission of said control codes, restoring means for returning said normal or reverse switch indication relay to its first position when the position of said switch lever does not correspond with the position of the track switch as reflected by the switch indication relays, said restoring means becoming effective when the code system is set into operation to transmit a control code for operating said track switch, and means controlled by said signal lever for preventing operation of said restoring means rendered effective by the operation of said signal lever to a position for clearing said signal.

44. In combination with a railway signal for governing traffic movements over routes including a track switch, a manually governed switch lever and route check relay having a signal clearing and a stop position located at a control office, a normal and a reverse switch indication relay at said office for storing indications of the position of the track switch, a code communication system for transmitting control codes from said office for governing said switch and signal in accordance with the positions of said switch lever and route check relay, respectively, and for also transmitting indication codes to the office to actuate said switch indication relays to thereby indicate the position of the track switch, manually operable means for initiating transmission of said control codes, restoring means for actuating said switch indication relays to cancel the stored indication of the track switch rendered effective when a control code is initiated provided the position of the switch lever does not correspond to the indicated position of the track switch, and means governed by said route check relay for preventing operation of said restoring means as long as said route check relay occupies its signal clearing position.

45. In combination with a railway signal for governing traffic movements over routes including a track switch, a code system for transmitting control codes for governing the operation of said track switch and signal in accordance with the positions of switch and signal levers at a control office and for also transmitting indication codes for indicating the position of said track switch, a normal and a reverse switch indication relay at said office, means responsive to an indication code transmitted only when the switch is in its normal or reverse position respectively for operating said normal or reverse switch indication relay from a first to a second position, a route check relay, means effective when said signal lever is reversed provided said normal or reverse switch indication relay is in its second position for actuating said route check relay, manually operable means for initiating transmission of said control codes, means controlled by said route check relay when actuated for rendering the control codes transmitted when said signal lever is reversed effective to clear said signal, restoring means for returning said normal or reverse switch indication relay to its first position, and means for rendering said restoring means effective when a control code for operating the track switch is initiated but only if said route check relay has not been actuated.

46. In combination with a code communication system connecting an office and a station, a railway track layout at the station containing electrically interlocked track switches and railway signals at the opposite ends of the tracks in said layout for governing traffic movements over the routes formed by the track switches, switch and signal levers at said office, a normal and a reverse switch indication relay at the office for each single switch or crossover in said layout, route check relays at the office controlled by said signal levers, manually operable means at the office for initiating transmission of control codes by said communication system for operating switch and signal control relays at the station to govern the switches and signals in accordance with the positions of their respective switch levers and route check relays, means at the station for initiating transmission of indication codes by said communication system for actuating the switch indication relays to indicate the positions of the track switches, means for actuating each route check relay when the associated signal lever is operated to a signal clearing position if and only if the switch indication relays for a route governed by such signal occupy their actuated positions, restoring means for each switch indication relay for returning such relay to a neutral position when a control code is initiated provided the indicated position of the track switch which controls such relay does not correspond to the position of its switch lever, means for rendering a control code effective to govern the operation of a track switch to a position corresponding to that of its switch lever effective only if the switch indication relay for the opposite position of the track switch has been restored to its neutral position to prevent the actuation of any route check relay for a route over the switch, and means for rendering a control code effective to clear a signal unless the corresponding route check relay occupies its actuated position.

47. In a centralized traffic control system for the control of railway track switches and of signals for governing the movement of traffic over said switches, said system including switch levers and switch indication relays for said switches, signal levers and signal indication relays for said signals, and route check relays controlled by the signal levers, all located at a control office, a communication system for transmitting control codes including elements for governing the operation of said switches in accordance with the positions of said switch levers and other elements for controlling said signals in accordance with the condition of the route check relays controlled by the signal levers, and for also transmitting indication codes to operate the indication relays to positions reflecting the positions of the switches and the condition of the signals, manually controllable means at the office for initiating the transmission of said control codes, a system of route circuits comprising means effective to actuate each route check relay when the associated signal lever is reversed provided certain of said indication relays indicate that a route governed by a signal assigned to such signal lever is available, and circuit means for governing the character of the switch and signal control elements in control codes by said route check relay so arranged that each code element assigned to the control of a track switch is effective to govern such switch only if no route relay has been actuated over a route circuit for a route which includes that track switch, and each code element assigned to the control of a signal is effective to clear such signal only when the route check relay associated therewith is actuated.

ARTHUR L. JEROME.
LLOYD V. LEWIS.
FRANK T. PASCOE.

REFERENCES CITED

The following references are of record in the file of this patent:

UNITED STATES PATENTS

| Number | Name | Date |
|---|---|---|
| 2,183,155 | Snavely et al. | Dec. 12, 1939 |
| 2,343,784 | McCann et al. | Mar. 7, 1944 |
| 2,389,975 | Hays | Nov. 27, 1945 |